(12) United States Patent
Higashihara et al.

(10) Patent No.: US 10,473,997 B2
(45) Date of Patent: Nov. 12, 2019

(54) ELECTROCHROMIC DEVICE ASSEMBLIES

(71) Applicant: Kinestral Technologies, Inc., South San Francisco, CA (US)

(72) Inventors: Ken Higashihara, South San Francisco, CA (US); John Gallipeo, South San Francisco, CA (US)

(73) Assignee: Kinestral Technologies, Inc., Hayward, CA (US)

( * ) Notice: Subject to any disclaimer, the term of this patent is extended or adjusted under 35 U.S.C. 154(b) by 258 days.

(21) Appl. No.: 15/230,157

(22) Filed: Aug. 5, 2016

(65) Prior Publication Data

US 2018/0011383 A1    Jan. 11, 2018

Related U.S. Application Data

(60) Provisional application No. 62/202,517, filed on Aug. 7, 2015.

(51) Int. Cl.
| *G02F 1/15* | (2019.01) |
| *G02F 1/153* | (2006.01) |
| *G02F 1/163* | (2006.01) |
| *G02F 1/1345* | (2006.01) |

(52) U.S. Cl.
CPC .............. *G02F 1/153* (2013.01); *G02F 1/163* (2013.01); *G02F 1/13452* (2013.01); *G02F 1/13458* (2013.01)

(58) Field of Classification Search
CPC .......... G02F 1/163; G02F 1/155; G02F 1/153; G02F 1/15; G02F 2001/1512; E06B 2009/2464; E06B 9/24; E06B 3/6722
See application file for complete search history.

(56) References Cited

U.S. PATENT DOCUMENTS

| 8,717,658 B2 | 5/2014 | Bergh et al. |
| 9,091,868 B2 | 7/2015 | Bergh et al. |
| 9,091,895 B2 | 7/2015 | Bergh et al. |

(Continued)

FOREIGN PATENT DOCUMENTS

| JP | 2003140197 | 5/2003 |
| WO | WO 2014134714 | 9/2014 |

OTHER PUBLICATIONS

International Seach Report and the Written Opinion of the International Searching Authority, PCT/US2016/045864, dated Nov. 28, 2016.

*Primary Examiner* — William R Alexander
*Assistant Examiner* — Balram T Parbadia
(74) *Attorney, Agent, or Firm* — Womble Bond Dickinson (US) LLP

(57) ABSTRACT

An electrochromic device is provided. The device includes a first substrate and a second substrate. The device includes electrochromic material, with the first substrate, the electrochromic material and the second substrate forming a laminate, the first substrate offset in a lateral direction from the second substrate along at least a portion of an edge of the electrochromic device. The device includes a plurality of terminals coupled to the electrochromic material, with at least two of the plurality of terminals exposed on the first substrate by the first substrate being offset in the lateral direction from the second substrate. A method of manufacturing an electrochromic device is also provided.

18 Claims, 14 Drawing Sheets

(56) References Cited

U.S. PATENT DOCUMENTS

| | | | |
|---|---|---|---|
| 2003/0227664 A1* | 12/2003 | Agrawal | G02F 1/1523 359/269 |
| 2006/0050356 A1* | 3/2006 | Varaprasad | B60R 1/12 359/265 |
| 2011/0051221 A1 | 3/2011 | Veerasamy | |
| 2012/0268803 A1 | 10/2012 | Greer et al. | |
| 2013/0271815 A1 | 10/2013 | Pradhan et al. | |
| 2014/0043668 A1 | 2/2014 | Bergh et al. | |
| 2015/0301423 A1* | 10/2015 | Orillard | B32B 17/10477 359/275 |
| 2016/0033841 A1* | 2/2016 | Gauthier | G02F 1/1339 359/245 |
| 2016/0202588 A1 | 7/2016 | Bass et al. | |
| 2016/0202590 A1 | 7/2016 | Ziebarth et al. | |

* cited by examiner

ELECTROCHROMIC DEVICE ASSEMBLIES

BACKGROUND

Electrochromic devices, which change in optical transmissivity as a result of applied voltage and current, are in use today in electrochromic windows and in automotive mirrors. Windows for buildings are often made as integrated glazing units (IGUs), which provide thermal insulation for the building and have an inner pane of glass and an outer pane of glass held apart by a spacer. A secondary seal typically surrounds the spacer. This works well for integrated glazing units of ordinary windows without electrochromic devices, with the spacer and the secondary seal hermetically sealing the two panes of glass and preventing moisture condensation in the inner space between the two panes. Electrical connections to bus bars of electrochromic devices pose design challenges, in an integrated glazing unit that should maintain hermetic sealing.

Electrochromic devices that are deposited as multiple thin layers on a single glass or plastic substrate require certain elements to make the necessary electrical connections. For example, physical vapor deposition (e.g., sputtering) can be used to deposit conductive and electrochromic layers to create an entire electrochromic device stack (e.g., bottom transparent conductor, electrochromic materials, ion conductor, top transparent conductor) on a single substrate. In some cases, vias are etched through one or more of the upper layers of the stack to expose the contacts to the lower layers of the stack that are buried beneath the upper layers in the stack so that all necessary electrical contacts are exposed. In other cases, masks are used during the deposition of the upper layers of the stack to expose the contacts to the lower layers of the stack so that all necessary electrical contacts are exposed.

Electrochromic devices that utilize electrochromic material contained within a chamber, which is defined by glass or plastic substrates with conductive layers and a peripheral edge seal, require different elements to make the necessary electrical connection. In some cases, metal clips are used to make electrical contact to the device. For example, electrochromic devices for automobile mirrors can use metal clips which function as both electrical connection and to improve the mechanical connection between the glass or plastic substrates of the device.

Electrochromic device assemblies can also be attached or laminated to additional pieces of glass or plastic to incorporate into different types of products. For example, an electrochromic device fabricated on a single sheet of glass, which is not heat strengthened or tempered, can be laminated to a second piece of tempered glass, and that laminated glass assembly can be attached to a glass lite via a spacer and secondary seal to form an IGU. Laminating a device substrate, which is not heat strengthened or tempered, to a piece of to the tempered glass increases the strength of the IGU to tolerate the required stresses experienced in operation. By way of further example, an electrochromic device with electrochromic materials disposed between two pieces of glass, which are not heat strengthened or tempered, can be laminated to a third piece of tempered glass, and that three piece of glass assembly can be attached to a glass lite using a spacer and secondary seal to form an IGU.

It is within this context that the embodiments arise.

SUMMARY

In some embodiments, an electrochromic device is provided. The device includes a first substrate and a second substrate. The device includes electrochromic material, with the first substrate, the electrochromic material and the second substrate forming a laminate, the first substrate offset in a lateral direction from the second substrate along at least a portion of an edge of the electrochromic device. The device includes a plurality of terminals coupled to the electrochromic material, with at least two of the plurality of terminals exposed on the first substrate by the first substrate being offset in the lateral direction from the second substrate.

In some embodiments, an integrated glazing unit (IGU) or laminated glazing unit (LGU) is provided. The unit includes a first substrate, a first transparent conductive layer on the first substrate, a first bus bar applied to the first substrate and the first transparent conductive layer, a second substrate, a second transparent conductive layer on the second substrate, a second bus bar applied to the second substrate and the second transparent conductive layer, and at least one layer of electrochromic material. The first pane, the first substrate, the at least one layer of electrochromic material, and the second substrate are provided as a laminated assembly, with at least a portion of a first edge of the second substrate recessed relative to at least a portion of a first edge of the first substrate, exposing at least a portion of the first bus bar for electrical connection.

In some embodiments, a method of making an electrochromic integrated glazing unit (IGU) or laminated glazing unit (LGU) is provided. The method includes offsetting a second substrate of an electrochromic device from a first substrate of the electrochromic device in a lateral direction and attaching the electrochromic device to one or more panes of transparent or translucent material to form an integrated glazing unit. The method includes coupling one or more wires to the one or more terminals of the electrochromic device.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Electrochromic device assemblies, including integrated glazing units (IGUs) and laminated glass units (LGUs), with electrochromic devices are described with details of connections to terminals of the electrochromic devices, in various embodiments. Two substrates of an electrochromic device can be laterally offset with respect to one another, forming a shelf or overhang that exposes some or all of the terminals of the electrochromic device. For purposes of explanation, a lateral direction is considered parallel to a plane of, or tangent to, a main body of the electrochromic device assembly, and a vertical direction is considered perpendicular to the main body of the electrochromic device assembly, e.g., through a thickness of the electrochromic device assembly and/or extending perpendicular to a major surface of the electrochromic device assembly.

Electrochromic Device Integrated Glazing Unit (IGU) Construction

Figure 1:
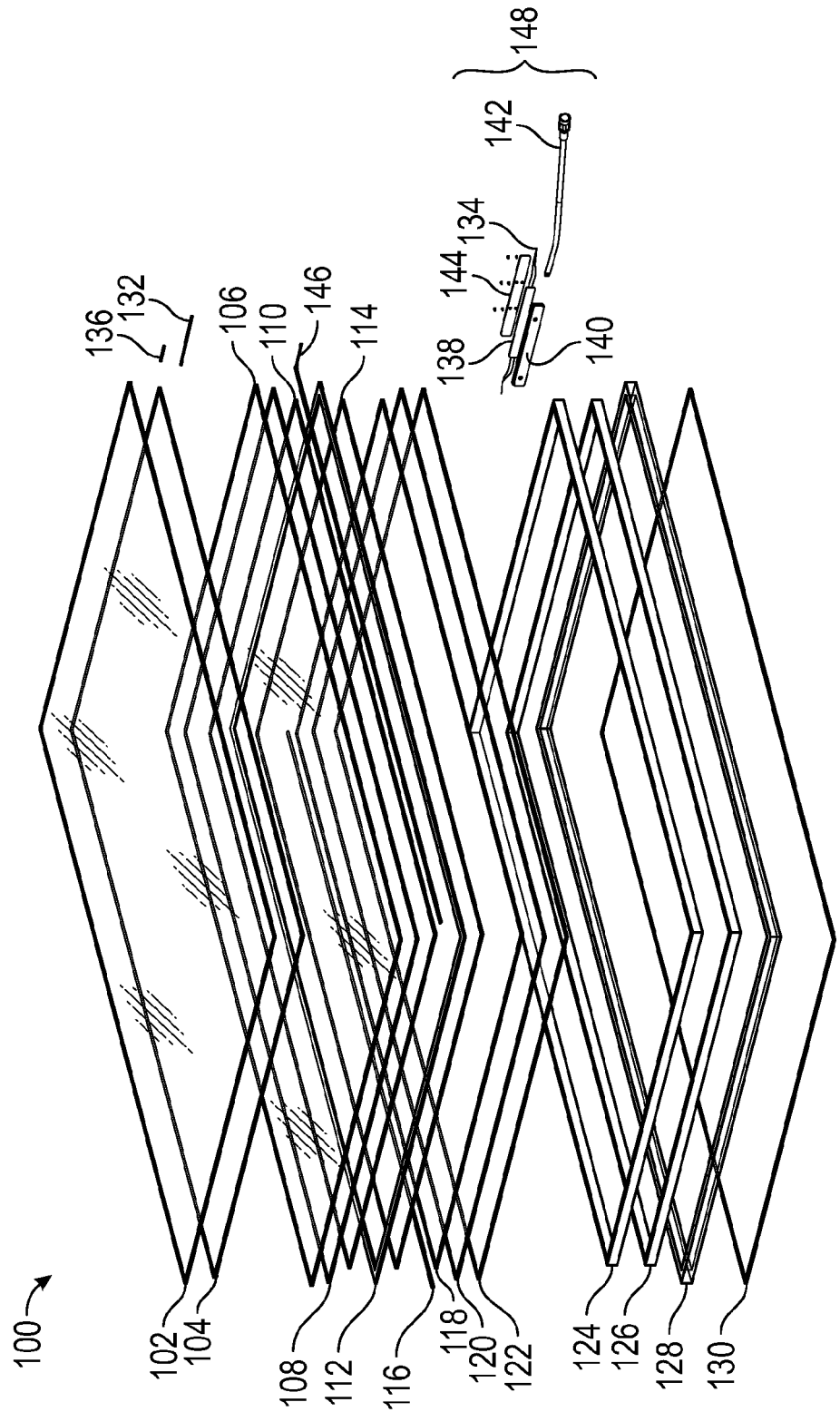
FIG. 1 is a perspective exploded view of an integrated glazing unit (IGU), showing layers and other aspects of an electrochromic device, a spacer, seals, and a driver or controller assembly in accordance with some embodiments.

FIG. 1 is a perspective exploded view of an integrated glazing unit (IGU) 100, showing layers 106, 108, 110, 114 118 120, 122 and other aspects of an electrochromic device, a spacer 124, seals 126, 128, and a driver or controller assembly 148. Like many ordinary, non-electrochromic integrated glazing units, the present integrated glazing unit 100 is thermally insulative and has an outer pane 102, and an inner pane 130, each of which could be glass or plastic or other transparent or translucent material. Other terms of art for integrated glazing unit include integrated glass unit and insulated glass unit, each of these terms of art are interchangeable. In addition to the outer pane 102 and the inner pane 130, the integrated glazing unit 100 has an electrochromic device disposed between these panes 102, 130. Placing the electrochromic device closer to the outer pane 102 than the inner pane 130 allows the adjustable tinting of the electrochromic device to shade the inner pane 130 and the space between the panes 102, 130, which decreases heating of the argon, nitrogen, air or other gas between the panes 102, 130 as compared to having the electrochromic device closer to the inner pane 130. However, this is not meant to be limiting as various embodiments could have the first pane 102 as an outer pane or an inner pane, and the second pane 130 could be an inner pane or an outer pane, relative to an interior space of a building in which the integrated glazing unit 100 is installed. Although present embodiments are depicted as flat, further embodiments of the integrated glazing unit 100 could use curved surfaces and materials, or angled surfaces, etc., and apply the mechanisms and arrangements described below.

In some embodiments, the electrochromic devices are composed of various layers of electrochromic material on a single substrate, which is then bonded to a single pane, which could be either the outer pane 102 or the inner pane 130 of an integrated glazing unit. The embodiment depicted in FIG. 1 has an electrochromic device with two substrates 106, 122 sandwiching multiple layers of electrochromic material. These substrates 106, 122 may be a thin glass or flexible substrate, where the substrate has a thickness of 1.0 mm or less and more particularly 0.5 mm or less. The substrates 106, 122 may be glass, plastic, or other transparent or translucent material. The layers of electrochromic material include a first transparent conductive oxide layer 108 deposited on or otherwise attached to a first substrate 106, a cathode layer 110, an ion conductor layer 114, an anode layer 118, and a second transparent conductive oxide layer 120 deposited on or otherwise attached to a second substrate 122. These layers could be fabricated or assembled in various ways, or variations could be devised. For example, the cathode layer 110 could be deposited onto the first transparent conductive oxide layer 108, and the anode layer 118 deposited onto the second transparent conductive oxide layer 120, with the ion conductor layer 114 or electrolyte applied to either the cathode layer 110 or the anode layer 118. Then, the two substrates 106, 122 could be brought together with the ion conductor layer 114 in the middle, to form the electrochromic device. In this example, the anode layer 118 and the cathode layer 110 may be applied by a wet process such as a sol-gel process or by the deposition of an ink containing electrochromic particles and the ion conductor layer 114 may be a viscous polymer. A sealant 112 is applied, in some embodiments, as a ring around the edges of the electrochromic device, to seal the first substrate 116 and the second substrate 122 together and protect the electrochromic material from degradation due to exposure to moisture or atmosphere. In some embodiments, poly isobutylene (PIB) is utilized as the sealant. It should be appreciated that other suitable sealant material may be integrated with the embodiments as PIB is one example of a sealant material. The seal created by the spacer 124 and the sealant 112 may be referred as a primary seal in some embodiments.

In some embodiments, the electrochromic device is attached to a carrier glass. In the embodiment shown in FIG. 1, electrochromic device is attached to the outer pane 102 which serves as the carrier glass in this embodiment, using a film layer 104, which could be an ethylene vinyl acetate (EVA) layer, polyvinyl butyral (PVB), polyurethane (PU), an ultraviolet activated adhesive, or other transparent or translucent bonding material. It is to be understood that the electrochromic device may alternatively be laminated to the inner pane 103 where the inner pane 103 serves as the carrier glass. The spacer 124 is attached to the second substrate 122, for example with a poly isobutylene (PIB) layer. The secondary seal 126 surrounds the spacer 124 laterally. Completing the integrated glazing unit lamination, the inner pane 130 is attached to the spacer 124 and the secondary seal 126. Thus, the electrochromic device is a laminate, the electrochromic device and the outer pane 102 are a laminate, and the outer pane 102, the electrochromic device and the inner pane 130 are a laminate, or laminated structure or laminated device. A gap or inner space between the second substrate 122 and the inner pane 130 can be filled with argon, nitrogen, dry air or other gas, to provide thermal insulation as a general characteristic of integrated glazing units. A tertiary seal 128 surrounds the secondary seal 126 and provides further sealing for the integrated glazing unit 100. In some embodiments, the tertiary seal 128 is applied as a liquid, gel or semisolid, such as a potting compound, which then cures to a flexible state. Some embodiments use a thicker first substrate 116 and/or second substrate 122, and omit the outer pane 102 and/or the inner pane 130. In a further embodiment, the outer pane 102 may be laminated to a first electrochromic device, and the inner pane 130 may be laminated to a second electrochromic device. In another embodiment, a first and a second electrochromic device may be laminated to one another to form a multi-pane electrochromic stack and then laminated to either the outer pane 102 or the inner pane 103. In this dual pane embodiment the two electrochromic devices may alternatively be laminated between two carrier glass substrates where one of the two carrier glass substrates may be the outer pane 102 or the inner pane 130. This arrangement allows lower light transmission in the fully darkened state, i.e., when both electrochromic devices are darkened.

Bus bars 116, 146 are formed on the substrates 106, 122, for controlling transmissivity of the electrochromic device. For example, an anode bus bar 116 could be formed along or proximate to one edge of the second substrate 122 prior to or after depositing the second transparent conductive oxide layer 120 onto the second substrate 122. A cathode bus bar 146 could be formed along or proximate to an opposite edge of the first substrate 106, prior to or after depositing the first transparent conductive oxide 108 onto the first substrate 106. One technique for depositing bus bars 116, 146 onto glass is to deposit down molten solder (e.g., a solder line) onto glass. Then, transparent conductive oxide can be deposited on to the solder and the glass. Or, transparent conductive oxide can be deposited to the glass, and then the solder is deposited on top of the transparent conductive oxide. In the embodiment shown, the anode bus bar 116 and cathode bus bar 146 are at or near opposed edges of the electrochromic device, and on opposed faces of electrochromic material. That is, the bus bars 116, 146 are attached to respective transparent conductive oxide layers 108, 120 on opposite sides of the thickness of the combination of the cathode layer 110, the ion conductive layer 114 and the anode layer 118. The bus bars 116, 146 are at or near opposed edges of the combination of the cathode layer 110, the ion layer 114 and the anode layer 118 in some embodiments. In further embodiments, multiple bus bars could be located in various ways, for example to accommodate different shaped substrates or to establish multiple zones of control and corresponding multiple zones of independently controlled tinting of the electrochromic device.

In some embodiments, the electrochromic device has pads 136 that may function as charge sequestration pads. The sequestration pads 136 in the embodiment illustrated by FIG. 1 allow charge of the electrochromic device to be sequestered in a sequestration region, controlled by two sequestration terminals which act as bus bars for the sequestration region, or one sequestration terminal and one bus bar 116, or other variations as readily devised in keeping with the teachings herein. In most circumstances, the device maintains charge neutrality, and charge is merely moved from one electrode to the other as the device switches. However, certain degradation mechanisms, can increase or decrease the total transportable charge in the device (e.g., spurious oxidation). This excess charge can be periodically eliminated via a sequestration process, wherein one or more redox elements located at certain spatial locations of the device would enable excess charge to be moved from within the device into the redox element. Sequestration terminals are electrically connected to the redox elements to enable separate control of the voltage and current applied to the redox element. Throughout this disclosure, "sequestration terminal" can include any redox element connected to the sequestration terminal. Sequestration terminals and redox elements are described in Publication No. US2016/0202588 and are herein incorporated by reference.

In an alternate embodiment the pads 136 are voltage sense pads. The voltage sense pads 136 allow a voltage of the electrochromic device to be measured at one or more sense terminals. A driver is used by the electrochromic device to charge and discharge the electrochromic device reliably, repeatedly and without exceeding a safe operating realm for the device. In order to do so, the driver can monitor a level of electric charge that is transferred to the electrochromic device, and also ensure that the potential of the electrochromic device does not exceed a predetermined safe operating limit. One or more sense voltage terminals located at certain spatial locations of the device would provide a measurement of the cell potential (i.e., voltage between the anode and cathode) of the device at a those spatial locations. If the sense voltage limit is reached the driver can react to prevent the device from being damaged. Sense voltage terminals and driver operation are described in Publication No. US2016/0202590, and is incorporated by reference. Two sense terminals could be used to measure sense voltage independently of the bus bars 116, 146 in some embodiments. One sense terminal could be used to measure sense voltage in comparison with one of the bus bars 116, 146, e.g., voltage across the sense terminal and the bus bar 116 or voltage across the sense terminal and the bus bar 146. Three or more sense terminals, or other variations to measure further sense voltages are readily devised in keeping with the teachings herein. In various embodiments, and in various combinations, the bus bars 116, 146, one or more sequestration terminals and/or one or more sense terminals include or are made of solder as described above for the bus bars 116, 146. Other materials could be used, in further embodiments.

Figure 2:
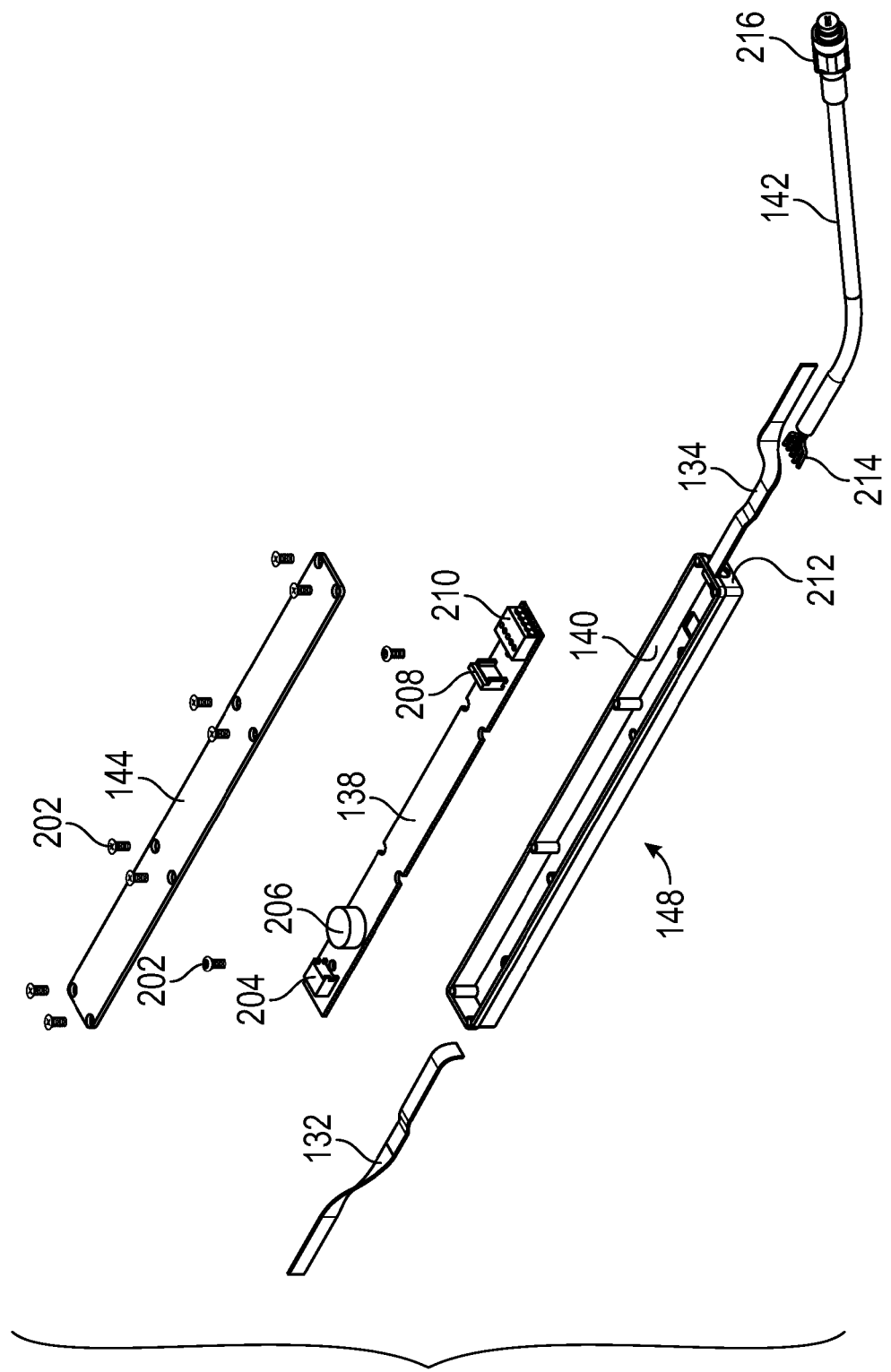
FIG. 2 is a perspective exploded view of the driver or controller assembly from the integrated glazing unit of FIG. 1 in accordance with some embodiments.
Figure 3:
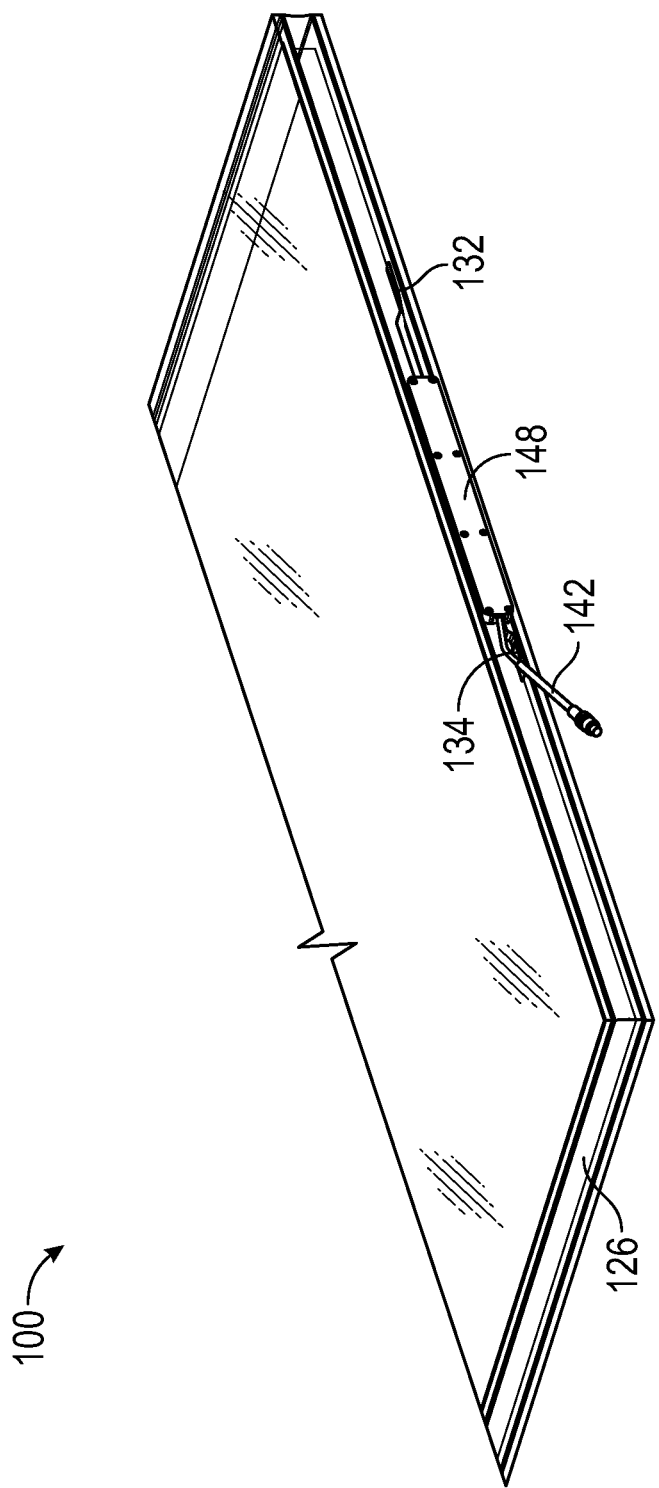
FIG. 3 is a perspective view of the assembled integrated glazing unit with the driver or controller assembly flush with or recessed from an edge of the integrated glazing unit in accordance with some embodiments.

In various embodiments, the driver or controller assembly 148 may be mounted to, assembled to, or integrated with the integrated glazing unit 100. Alternatively the driver or controller assembly 148 may be placed locally to the integrated glazing unit 100 within a cabinet, the cabinet containing multiple driver or controller assembly units 148. As illustrated in FIGS. 1-3, the controller assembly 148 is attached to an edge of the electrochromic device and the integrated glazing unit 100, but could be mounted elsewhere. Controller assembly 148 may be referred to as a driver assembly in some embodiments. An enclosure 140, and a cover 144, both of which could be made of plastic, metal or other durable material form a housing. Inside the housing is a controller board 138 with electronic components for controlling or driving the electrochromic device. In some embodiments, controller board 138 may be referred to as a driver board. Two circuit boards or flex circuits 132, 134 or other wiring couple the controller board 138 to the bus bars 116, 146 and, in some embodiments, the sequestration and/or sense pads 136. A power and communication cable 142 extends from the housing (i.e., the enclosure 140 and the cover 144, and through an aperture in one, the other or both), to couple the controller board 138 to external power and communications. For example, controller board 138 may couple to a network connector with power over Ethernet (POE) capability. In variations, the controller assembly 148 includes a wireless module and does not require communication through the cable 142. In some embodiments, the controller assembly 148 uses solar cells, one or more batteries, or other local power supply, to provide some local power to supplement the power provided to the cable 142. Alternatively, the inclusion of solar cells, one or more batteries, or other local power supply could obviate the need for external power provided by cable 142. The controller assembly 148 could have both wireless and local power supply capabilities, and not use a cable 142 at all in some embodiments.

FIG. 2 is a perspective exploded view of the controller assembly 148 of the integrated glazing unit 100 of FIG. 1. To assemble the controller assembly 148, the controller board 138, with various electronics components 204, 206, 208, 210 mounted to the controller board 138, is placed inside the enclosure 140. A fastener 202 may be used to secure the controller board 138 to the enclosure 140, or tabs, slots or other mechanical features or devices could be used. The flex circuits 132, 134, which have flexible wires on a flexible substrate, are assembled to the controller board 138, for example with the use of zero insertion force (ZIF) connectors (e.g., two of the components 204, 210) on the controller board 138. This could be done before or after the controller board 138 is placed in the enclosure 140, and before or after the flex circuits 132, 134 are assembled to terminals of the electrochromic device or devices. Likewise, the cable 142 could be assembled, at various times or stages in the assembly process, to the controller board 138. The cover 144 is assembled to the enclosure 140, with a fastener 202 or other feature or device such as snap connection, adhesive, sliding grooves, etc. In some embodiments, potting compound or other filler is used in place of a cover 144. Variations on the driver or controller assembly 148 are readily devised in keeping with the teachings herein. For example, rigid circuit boards and/or attached wires could be used in place of the flex circuits.

FIG. 3 is a perspective view of the assembled integrated glazing unit 100 with the controller assembly 148 flush with or recessed from an edge of the integrated glazing unit 100. In some embodiments, the controller assembly 148 is flush with or recessed from an edge of the electrochromic device. To create sufficient space for flush or recessed mounting of the controller assembly 148, the secondary seal 126 is recessed from the edge of the integrated glazing unit 100 in some embodiments. This creates a recess, e.g., a recessed region or volume, bounded by the spacer 124, the second pane 130, the electrochromic device, and/or the first pane 102 (see FIGS. 1, 4A, 4B and 5), into which the controller assembly 148 can be assembled or disposed. The tertiary seal 128 (see FIG. 1) could be applied after the flex circuits 132, 134 are coupled to the electrochromic device (see FIGS. 4A, 4B and 5), and before or after the controller assembly 148 is seated flush with or recessed from the edge of the integrated glazing unit 100. When present in an embodiment, the cable 142 extends from the controller assembly 148 and from the tertiary seal 128. In other embodiments, the controller assembly is located in a different location in the IGU, such as closer to a corner of the IGU or along a different edge. In other embodiments, the controller assembly is located in the frame of the IGU and outside of the assembly shown in FIG. 1. In some embodiments, the controller assembly is located outside of the IGU, where it may be close to the IGU (e.g., less than 10 feet away). When located outside of the IGU the controller assembly may be housed in a cabinet along with the controller assemblies for other IGU's having electrochromic devices or smart features. In some embodiments, the controller assembly includes a local power supply, such as a battery.

Figure 4A:
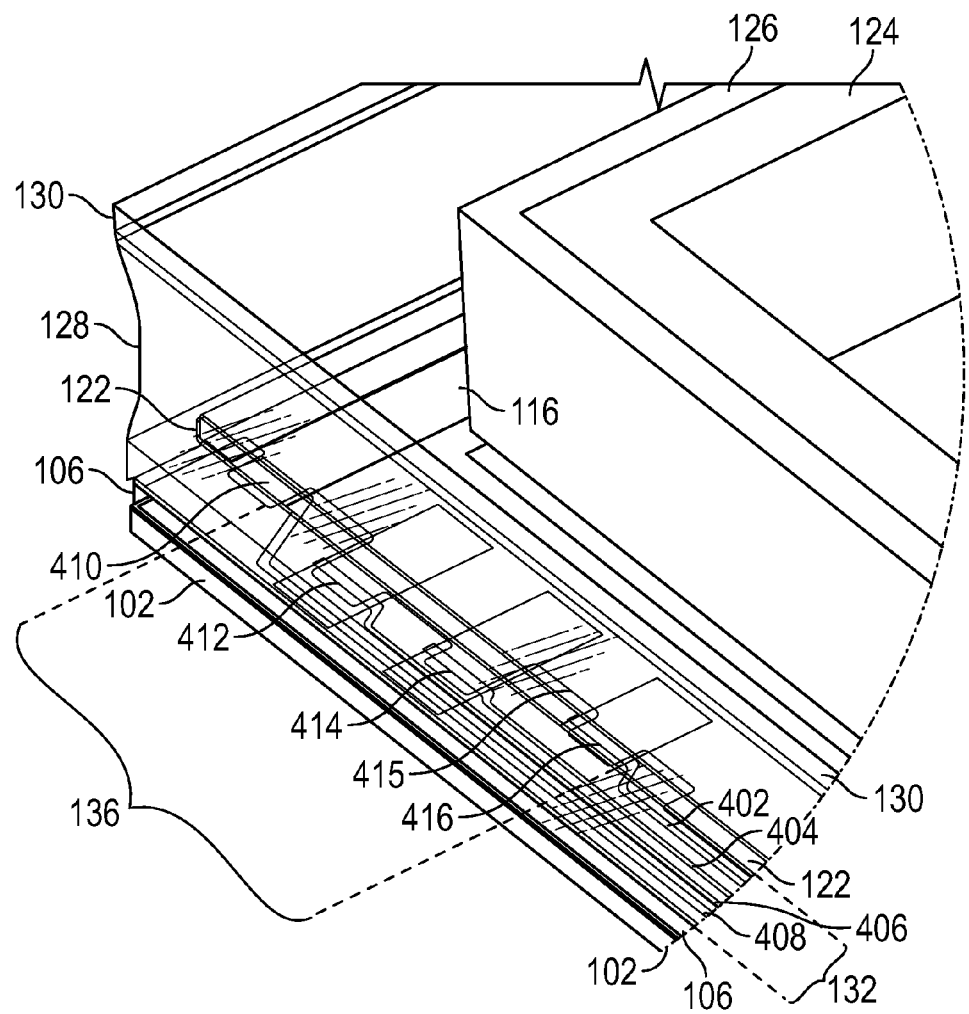
FIG. 4A is a perspective view of one corner of the integrated glazing unit, showing terminals of the electrochromic device in a region where one substrate of the electrochromic device is offset from another substrate of the electrochromic device to expose the terminals in accordance with some embodiments.

FIG. 4A is a perspective view of one corner of the integrated glazing unit 100, showing terminals 412, 414 of the electrochromic device in a region where one substrate 122 of the electrochromic device is offset from another substrate 106 of the electrochromic device to expose the terminals 412, 414. This view is upside down, in comparison with the view shown in FIG. 1, and can be visualized as taking the materials shown in FIG. 1, and assembling them, then rotating the resultant assembly along a horizontal axis extending diagonally from top left to lower right in FIG. 1. Thus, the illustration in FIG. 4A is showing the far left corner, formerly the far right corner at the top of FIG. 1. One of the flex circuits 132 is shown split into four wires 402, 404, 406, 408, which couple, respectively, to terminals 416, 414, 412, 410 of the electrochromic device, although other arrangements of wires or a flex circuit could be devised in variations.

There are multiple embodiments for how the substrate 122 is offset from the other substrate 106 (and equivalently, vice versa). The two substrates 122, 106 could be laterally displaced, one relative to the other, and then assembled together as a lamination. For example, the first substrate 106 could be moved rightward relative to the second substrate 122 in FIG. 1 or leftward relative to the second substrate 122 in FIG. 4A in some embodiments. The second substrate 122 could be moved leftward relative to the first substrate 106 in FIG. 1 or rightward relative to the first substrate 106 in FIG. 4A in some embodiments. The second substrate 122 could be laser cut or otherwise cut before or after assembly to the first substrate 106. The two substrates 106, 122 could be cut to differing dimensions, e.g., the second substrate 122 shorter than the first substrate 106. In some embodiments, the edge of the second substrate 122 is shaped in a series of notches and tabs, with the terminals 410, 412, 414, 416 (and also the terminal 502 shown in FIG. 5) extending laterally outward from the main body of the second substrate 122 as the tabs or portions of the tabs, as shown in the ghost line 415 in FIG. 4A. In variations, this could be done with the first substrate 106, or both substrates 106, 122. The offset creates an overhang or shelf, with one edge of the second substrate 122 recessed from one edge of the first substrate 106 and terminals 412, 414 that are exposed, i.e., not covered or otherwise obscured by the second substrate 122. The overhang or shelf is an exposed portion of the first substrate 106, e.g., with the first transparent conductive oxide layer 108 (see FIG. 1) showing. In some embodiments, the cathode layer 110, ion conductor layer 114, and anode layer 118 are absent on the overhang or shelf, either by trimming these materials back or otherwise removing them from, or not depositing them in the first place on, the overhang or shelf region, so that access to the terminals 410, 412, 414, 416 (and terminal 502) is readily available without obscuring material in the electrochromic device. The overhang or shelf could include an entire edge of the electrochromic device, or a portion of an edge, one or two corners (and a portion or entirety of an edge), or more than one edge, etc. Further, the overhang or shelf contributes to defining the recess described above with reference to FIG. 3, with the inward displacement of the edge of the second substrate 122 contributing to the volume of the recess.

There are multiple embodiments for how the wires 402, 404, 406, 408 couple to the terminals 416, 414, 412, 410. The two terminals 412, 414 that are exposed by the offset of the second substrate 122 relative to the first substrate 106 could each have a wire 406, 404 soldered to them, manually, or with an automated soldering device, or with solder reflow. In some embodiments, these terminals 412, 414 are a sequestration terminal and a sense terminal. Terminals 116 and 416 are deposited on the second substrate 122. The flex circuit 132 is reflow soldered to these terminals prior to assembling the second substrate 122 and the first substrate 106 together, in one embodiment. On first substrate 106, terminals 412 and 414 are deposited so that the terminals are exposed on the step (also referred to as the shelf or overhang) of first substrate 106 and extend some distance under the second substrate 122. The flex circuit 132 traces that overlap terminals 412 and 414 are then reflow soldered together as the traces overlapping the terminals are exposed on the shelf or overhang. In FIG. 4A, the anode bus bar 116 (or, in further embodiments this could be a cathode bus bar) is shown as a line of solder along or near an edge of a back or downward face of the second substrate 122 (or front, upward face of the second substrate 122 in FIG. 1), with the bus bar 116 and the second substrate 122 covered by the second transparent conductive oxide layer 120. That is, from top to bottom in FIG. 4A, the second substrate 122 is followed by the bus bar 116 (seen through the second substrate 122) and then the transparent conductive oxide layer 120 (see FIG. 1). The wire 408 could be attached to the bus bar 116 by removing a portion of the transparent conductive oxide layer 120 to expose a portion of the bus bar 116 as the terminal 410, or the transparent conductive oxide layer 120 could be deposited so as to leave a portion of the bus bar 116 exposed as the terminal 410. Then, the wire 408 could be attached to the bus bar 116 by manual soldering, automated soldering or solder reflow. Similarly, the wire 402 could be attached to the terminal 416, a further sense terminal in this embodiment, by exposing a portion of the terminal 416. An electrically insulative material could be applied, or various layers of the electrochromic device suitably dimensioned or arranged, so that the first transparent conductive layer 108 does not electrically short to the second transparent conductive layer 120 during soldering operations. In variations, other electrical connection materials or mechanisms could be applied for connecting wires to terminals. In embodiments where the transparent conductive oxide layer 108 is first applied to the second substrate 122 prior to laying down the bus bar 116, the corresponding wire 408 is readily attached to the bus bar 116 without need of removing or further dimensioning of the transparent conductive oxide layer 108.

Figure 4B:
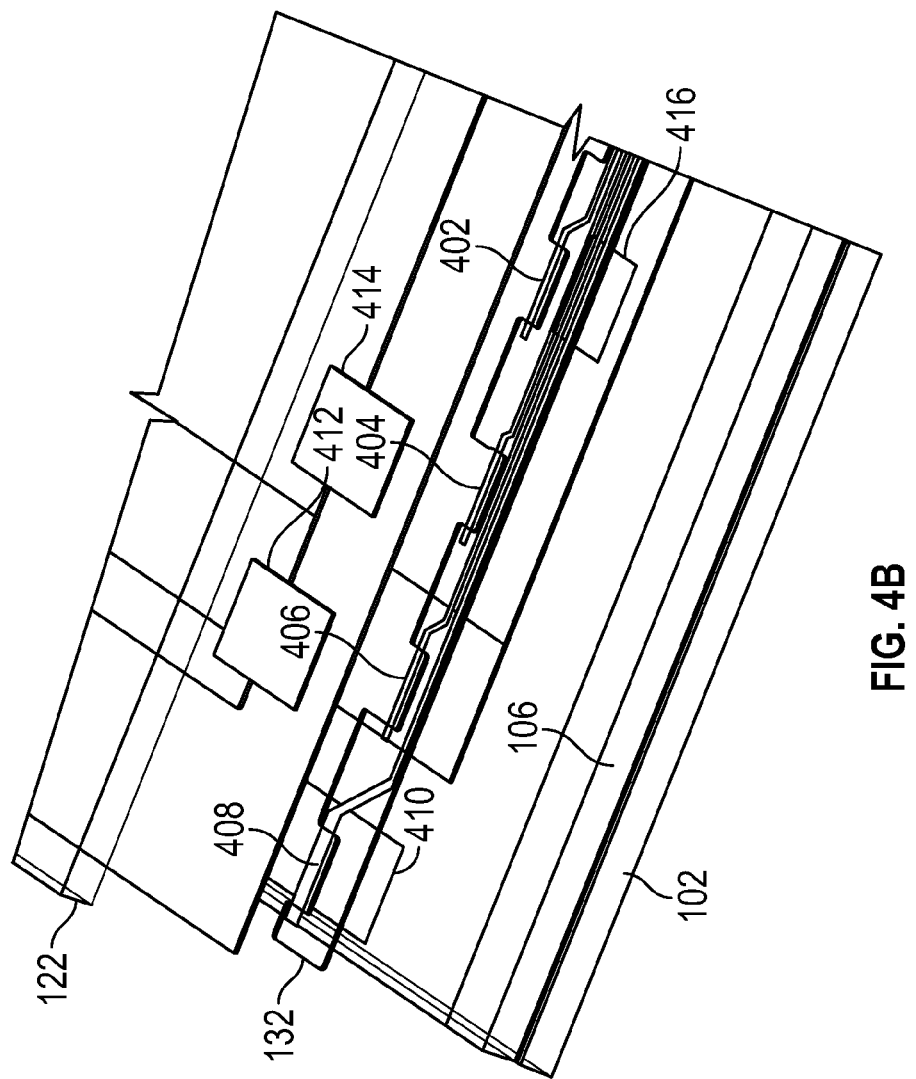
FIG. 4B is a perspective exploded view of the corner of the integrated glazing unit shown in FIG. 4A in accordance with some embodiments.

FIG. 4B is a perspective exploded view of the corner of the integrated glazing unit 100 shown in FIG. 4A. Notches in the flex circuit 132 expose portions of wires 402, 404, 406, 408. The exposed portions of the wires 402, 404, 406, 408 are available for connection to the respective terminals 416, 414, 412, 410 of the electrochromic device. In the embodiment shown, these terminals 410, 412, 414, 416 include or are made of solder. A reflow process (using applied heat) melts the solder, which then electrically and physically bonds the wire to the terminal, for each wire and terminal pair in some embodiments. This process takes place in the shelf or overhang region created by the offset of the second substrate 122 relative to the first substrate 106. In some embodiments, the connections to the terminals 410 and 416 are made before the first substrate 106 and second substrate 122 are paired, and these connections are embedded within the device. In such embodiments, the process in the shelf or overhang region applies to the terminals 412 and 414. It should be appreciated that FIG. 4B is an exploded view for illustrative and explanation purposes and in most embodiments the terminals 410 and 416 are closer to substrate 122 and terminals 412 and 414 are closer to substrate 106, as illustrated in FIG. 4A.

Figure 5:
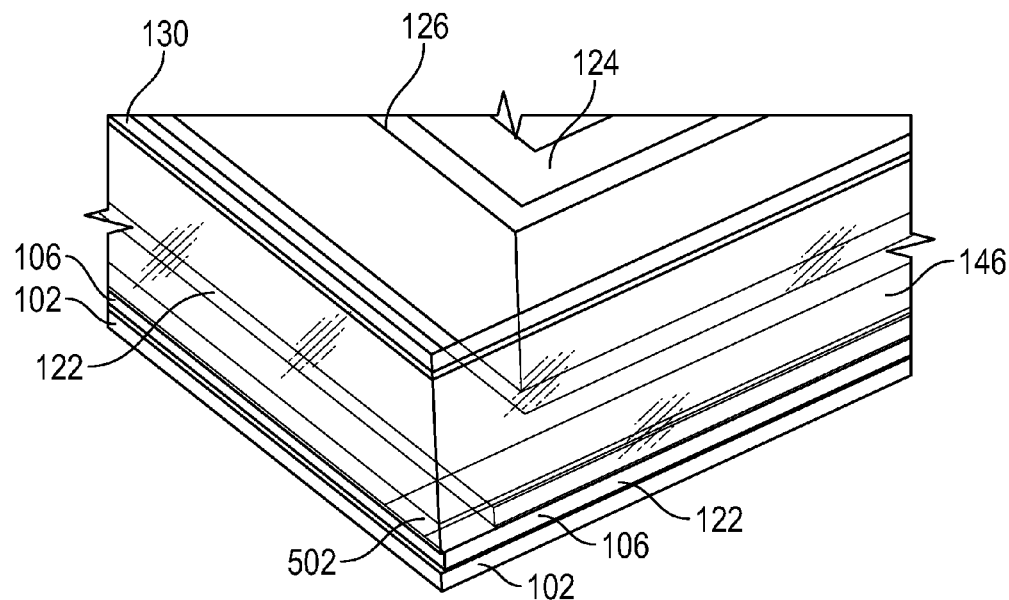
FIG. 5 is a perspective view of another corner of the integrated glazing unit, showing an exposed terminal of the electrochromic device in accordance with some embodiments.

FIG. 5 is a perspective view of another corner of the integrated glazing unit 100, showing an exposed terminal 502 of the electrochromic device. This corner can be visualized as the near left companion to the corner shown in FIG. 4A, and viewed upside down from the near right corner of the integrated glazing unit 100, depicted on the right side of FIG. 1. In this embodiment, the terminal 502 is a bus bar terminal of the cathode bus bar 146, but could be a terminal of an anode bus bar in further embodiments, or some other terminal. Similar to the terminals 412, 414, the terminal 502 is exposed by the offset of the second substrate 122 relative to the first substrate 106. It should be appreciated that the cathode layer 110, ion conductor layer 114 and anode layer 118 are absent on this portion of the overhang or shelf, and the first transparent conductive oxide layer 108 is either removed from or is beneath (relative to the drawing orientation) the solder line at the portion of the solder line that forms the terminal 502. Various combinations of these, in various embodiments, expose the terminal 502 for connection. A wire of the flex circuit 132 is connected to the terminal 502 by soldering as described above. The shelf or overhang region described above provides ample space for connection of the flex circuit 132, 134 to various terminals of the electrochromic device. In comparison, an electrochromic device with no shelf or overhang region, and two substrates with no offset, offers no such area for connection to terminals of the electrochromic device. Attempting to insert wires or a flex circuit between the two substrates, for example by prying apart the two substrates, could damage the electrochromic device and/or the substrates. Connecting wires or a flex circuit to terminals of an electrochromic device and then attempting to sandwich two substrates together might result in a gap between the two substrates as a result of the thickness of the wires or the flex circuit. A solder reflow process might be difficult or impossible when the solder lines are trapped between two substrates and not exposed as the shelf or overhang region allows.

Electrochromic Device Circuitry

An electrochromic device is described herein with details of connections to terminals of the electrochromic device, in various embodiments. In many of the embodiments described herein, two substrates of the electrochromic device are laterally offset with respect to one another, forming a shelf or overhang that exposes some or all of the terminals of the electrochromic device. FIGS. 6A-8 describe such an electrochromic device and provide greater detail around the electronics and wiring of the device. In this specification, embodiments of this electrochromic device are described as part of an integrated glazing unit (IGU) (FIGS. 1-5, and 9-12B) and as part of a laminated glazing unit (LGU) (FIGS. 13A and 13B.) These embodiments provide different configurations of electrochromic devices that have been laminated to one or more pieces of carrier glass as well as embodiments where multiple electrochromic devices have been laminated to one another.

Figure 6A:
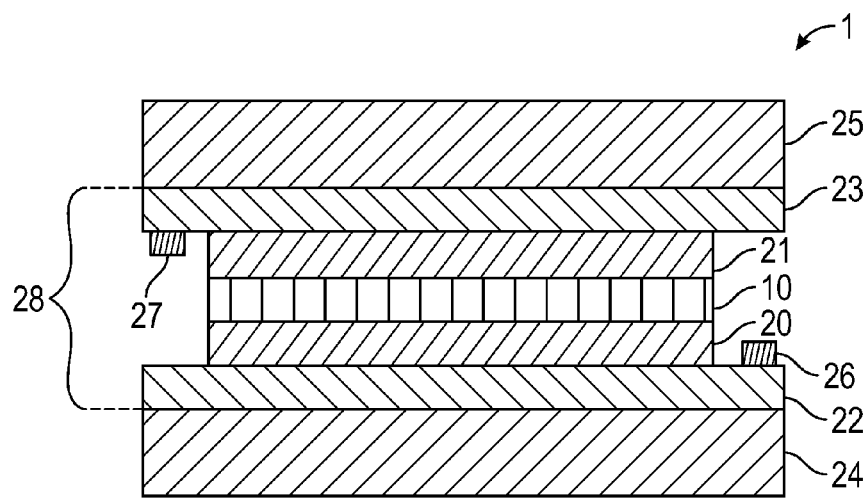
FIG. 6A is a schematic cross-section of a multi-layer electrochromic device in accordance with some embodiments.

FIG. 6A depicts a cross-sectional structural diagram of electrochromic device 1 according to an embodiment of the present disclosure. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises electrochromic material; in one embodiment, first and second electrode layers 20, 21 each comprise electrochromic material. The central structure, that is, layers 20, 10, 21, is positioned between first and second electrically conductive layers 22 and 23 which, in turn, are arranged against "outer substrates" 24, 25. Elements 22, 20, 10, 21, and 23 are collectively referred to as an electrochromic stack 28. In some embodiments, substrate 24 can also be referred to as the lower substrate, and substrate 25 can be referred to as the upper substrate to aid in the further description of the invention. The terms upper and lower are not meant to be limiting and it is to be understood that the "outer substrates" 24 and 25 may have any orientation.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of the electrochromic stack 28 may be changed by applying a voltage pulse to electrically conductive layers 22 and 23. The pulse causes electrons and ions to move between first and second electrode layers 20 and 21 and, as a result, electrochromic material in the first and/or second electrode layer(s) change(s) optical states, thereby switching electrochromic stack 28 from a more transmissive state to a less transmissive state, or from a less transmissive state to a more transmissive state. In one embodiment, electrochromic stack 28 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by electrochromic materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an electrochromic device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific electrochromic device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" may refer to an optically neutral state, e.g., uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In some embodiments, the upper substrate is coated with an electrically conductive layer and an electrode, the lower substrate is coated with an electrically conductive layer and an electrode, and then the upper and lower substrates are laminated together to form the electrochromic stack using the polymeric ion conductor layer between the substrates, forming a structure such as the one shown in the example in FIG. 6A. The electrically conductive layers can be scribed to electrically isolate different regions of the device, such as the sense voltage terminal regions, sequestration regions, and a primary device region. In some embodiments, the electrically conductive layers are scribed using mechanical scribing, laser scribing, or masking (e.g., via lithography) followed by chemical etching. The electrically conductive layers can also be selectively deposited to electrically isolate different regions of the device, such as the sense voltage terminal regions, sequestration regions, and a primary device region.

In some cases, an electrochromic device of this disclosure also has one or more electrically conductive layers that have spatially varying properties. In some cases, an electrochromic device of this disclosure has one or more electrically conductive layers, where the properties (for example resistivity and/or doping density) or structure (for example thickness and/or ablated pattern) of one or more of the electrically conductive layers are varying in such a way to cause a spatially varying sheet resistance, or non-linear resistance as a function of distance along the sheet. The electrically conductive layers may be one or more transparent conductive layer materials where the spatially varying properties of the transparent conductive layer is achieved through the use of a gradient in one or more of the transparent conductive layer materials. Examples of transparent conductive layer materials include transparent conductive oxides, transparent conductive polymers, metal grids, carbon nanotubes, graphene, nanowire meshes, and ultra thin metal films. Examples of transparent conductive oxides include indium tin oxide (ITO), fluorine doped tin oxide (FTO), or doped zinc oxide. In one particular embodiment the electrochromic device substrates may have a first transparent conductive layer having a gradient pattern formed over the electrochromic device substrate and a second transparent conductive layer that is continuous (does not have a gradient pattern) formed over the first transparent conductive layer having a gradient pattern. In one embodiment the first transparent conductive layer may be indium tin oxide (ITO) and the second transparent conductive layer may be tantalum pentaoxide doped tin oxide (TTO.) The gradient in the transparent conductive layers of the electrochromic device may be formed by different techniques such as by creating a gradient in the composition of the transparent conductive layer or by patterning the materials with a scribe or etchant to effectively create an "electron maze." Regardless of the technique used, the gradients on opposing transparent conductive layers may have an inverse symmetry to one another. The gradient transparent conductive layer allows for the use of electrochromic devices in panels used for large scale applications such as architectural windows or in transportation applications such as buses and trains or automotives. This is because with a gradient transparent conductive oxide there is not a drop in effective voltage across the electrochromic device once the voltage is applied to the electrochromic device at the bus bars which provides for a uniform transition between tint states across all dimensions of the electrochromic panel. More details on gradient transparent conductive layers and different embodiments applicable to the electrochromic devices described in this specification can be found in U.S. Pat. No. 8,717,658 entitled Electrochromic Multi-Layer Devices With Spatially Coordinated Switching (incorporated herein by reference), U.S. Pat. No. 9,091,895 Electrochromic Multi-Layer Devices With Composite Electrically Conductive Layers (incorporated herein by reference), U.S. Pat. No. 9,091,868 Electrochromic Multi-Layer Devices With Composite Current Modulating Structure (incorporated herein by reference), and patent application number US 2014/0043668 Electrochromic Multi-Layer Devices With Current Modulating Structure (incorporated herein by reference.) The gradient transparent conductive layers 520 and 522 not only remove the "iris effect" problem that larger scale electrochromic devices have by enabling the uniform transition between states across the entire surface of the electrochromic panel, but enables the fast transition between tint states and in particular from the clear state to the dark state and vice versa.

A driver is used by the electrochromic device to charge and discharge the electrochromic device reliably, repeatedly and without exceeding a safe operating realm for the device. In order to do so, the driver can monitor a level of electric charge that is transferred to the electrochromic device, and also ensure that the potential of the electrochromic device does not exceed a predetermined safe operating limit. One or more sense voltage terminals located at certain spatial locations of the device would provide a measurement of the cell potential (i.e., voltage between the anode and cathode) of the device at a those spatial locations. If the sense voltage limit is reached the driver can react to prevent the device from being damaged. Sense voltage terminals and driver operation are described in Publication No. US2016/0202590, and is incorporated by reference.

In most circumstances, the device maintains charge neutrality, and charge is merely moved from one electrode to the other as the device switches. However, certain degradation mechanisms, can increase or decrease the total transportable charge in the device (e.g., spurious oxidation). This excess charge can be periodically eliminated via a sequestration process, wherein one or more redox elements located at certain spatial locations of the device would enable excess charge to be moved from within the device into the redox element. Sequestration terminals are electrically connected to the redox elements to enable separate control of the voltage and current applied to the redox element. Throughout this disclosure, "sequestration terminal" can include any redox element connected to the sequestration terminal. Sequestration terminals and redox elements are described in Publication No. US2016/0202588 and are herein incorporated by reference.

The bus bars (e.g., elements 26 and 27 in FIG. 6A), sense voltage terminals, and sequestration terminals can be connected to a circuit board. The circuit board can include connector leads, which interface with a connector. The connector, in turn, provides the electrical connection to the controller assembly, driver and/or the power supply through a cable harness.

In some embodiments, the bus bars, sense voltage terminals, and sequestration terminals are directly connected to the circuit board. Some examples of direct connections between the bus bars, sense voltage terminals, and sequestration terminals and the circuit board are soldered connections, ultrasonic welds, or conductive adhesive. In some embodiments, the bus bars, sense voltage terminals, and sequestration terminals can be connected to a conductive member, which is connected to the circuit board. Some examples of conductive members connecting the bus bars, sense voltage terminals, and sequestration terminals to the circuit board are metallic ribbon, copper ribbon, flexible ribbon cables, and conductive wires. Some examples of how the conductive members can be connected to the bus bars, sense voltage terminals, sequestration terminals, and the circuit boards are soldered connections, ultrasonic welds, or conductive adhesive.

The circuit boards described herein can be rigid or flexible. The circuit board substrate can be made from a rigid material such as woven fiberglass cloth impregnated with an epoxy resin, cotton paper impregnated with resin, aluminum, alumina, matte glass and polyester, or other rigid polymeric materials. Some examples of materials used in rigid circuit boards are FR-2, FR-4, G-10, CEM-1, CEM-2, PTFE, aluminum, and alumina. The circuit board substrate can be made from a flexible material such as, polyimide foil, polyimide-fluoropolymer composite foil, or other flexible polymeric materials. Some examples of materials used in flexible circuit boards Kapton and Pyralux.

In some embodiments, there is a connector between the circuit board and the cable harness. The connector between the circuit board and the cable harness can be a standard connector or a custom connector. Some examples of standard connector are ZIF connectors (zero insertion force connectors), hot bar solder connectors, and other types of flat flexible cable connectors. In some embodiments, the connector between the circuit board and the cable harness can be designed to fit in between the upper and lower substrate of the electrochromic device after assembly. The connector between the circuit board and the cable harness can be less than 5 mm thick, less 3 mm thick, or less than 1 mm thick.

Figure 6B:
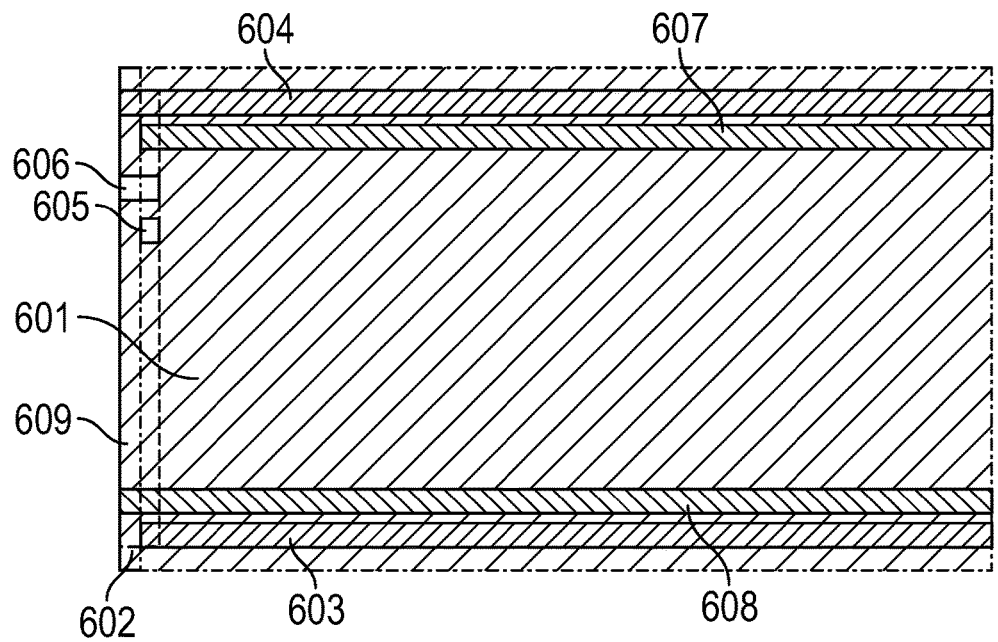
FIG. 6B is a top-down view of an electrochromic device in accordance with some embodiments.

FIG. 6B shows an electrochromic device from the top-down, in an embodiment. The figure shows the bus bar connected to the electrode on the upper substrate (i.e., the upper bus bar) 603, the bus bar connected to the electrode on the lower substrate (i.e., the lower bus bar) 604, the sense voltage terminal on the upper substrate (i.e., the upper sense voltage terminal) 605, the sense voltage terminal on the lower substrate (i.e., the lower sense voltage terminal) 606, the sequestration terminal on the upper substrate (i.e., the upper sequestration terminal) 607, and the sequestration terminal on the lower substrate (i.e., the lower sequestration terminal) 608. The use of the terms "upper" and "lower" are to aid in the description of the invention and are not meant to be limiting. The components described in the figures may be referred to as upper and lower, but it is to be understood that any orientation of the components with respect to one another is possible. In this particular embodiment, the upper substrate 601, is smaller than the lower substrate 602 in one dimension, and the upper substrate 601 is offset in a lateral direction from the lower substrate 602 along one edge of the electrochromic device. In this embodiment, the lower bus bar 604, lower sense voltage terminal 606 and lower sequestration terminal 608 are exposed by the upper substrate 601 being offset in the lateral direction from the lower substrate 602.

In other embodiments, the upper substrate can be larger than the lower substrate in one dimension, and the bus bars, sense voltage terminals, and sequestration terminals on the upper substrate can be exposed by the lower substrate being offset in the lateral direction from the lower substrate.

In other embodiments, the upper substrate and lower substrate can be different sizes in more than one dimension, and be offset in more than one lateral direction. In other embodiments, the upper substrate and lower substrate can be the same dimensions, and be offset in one or more lateral dimensions, thereby creating one or more overhangs on both the upper and lower substrates.

In embodiments where the offset between upper and lower substrates exposes the bus bars, sense voltage terminals, and sequestration terminals on one of the substrates, the circuit board can make contact with these exposed elements. The circuit board can extend in between the two substrates to make contact to the unexposed elements (i.e., bus bars, sense voltage terminals, and sequestration terminals on the substrate that is not exposed). In some cases, a conductive member can be also be used to make contact to the unexposed elements (i.e., bus bars, sense voltage terminals, and sequestration terminals on the substrate that is not exposed), and the conductive member can be electrically connected to the circuit board.

Referring again the embodiment in FIG. 6B, the bus bars, sense voltage terminals, and sequestration terminals on the lower substrate are exposed and can be contacted after the upper and lower substrates are laminated together. The circuit board 609 extends between the upper and lower substrate, allowing the circuit board 609 to make contact with the unexposed upper sense voltage terminal 605 and upper sequestration terminal 607. The circuit board 609 also extends beyond the edge of the upper substrate, allowing a connector to make electrical contact to the circuit board 609 after the upper and lower substrates are assembled together.

In the embodiment shown in FIG. 6B, all of the connections between the circuit board 609 and the bus bars 603 and 604, sense voltage terminals 605 and 606, and sequestration terminals 607 and 608, can be direct electrical connections (i.e., do not require a conductive member between the circuit board and the bus bars, sense voltage terminals, and sequestration terminals). In other embodiments, some of these connections could also require a conductive member between the circuit board and one or more of the bus bars, sense voltage terminals, and sequestration terminals.

Figure 6C:
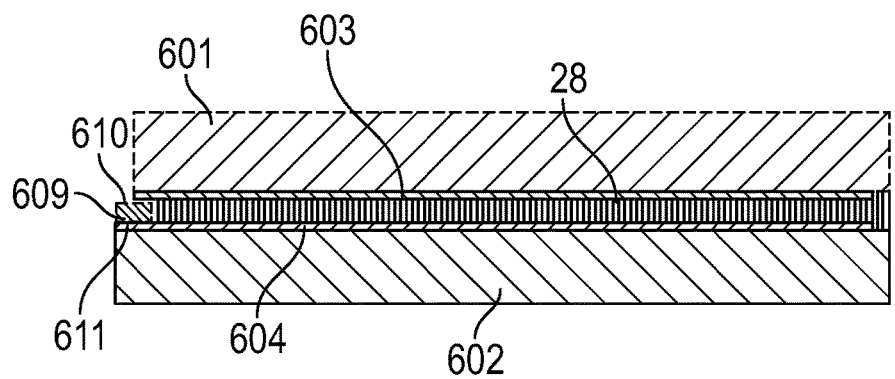
FIG. 6C is a cross-section view of an electrochromic device in accordance with some embodiments.

FIG. 6C shows a cross-section of the embodiment structure shown in FIG. 6B, where the upper substrate 601 is offset the lateral direction from the lower substrate 602. The cross-section of the embodiment in FIG. 6C shows that the upper bus bar 603 is unexposed after the upper and lower substrates are assembled together with the electrochromic stack (e.g., element 28 in FIG. 6A) between them, and the lower bus bar 604 is exposed after the upper and lower substrates are assembled together. The circuit board 609 is shown extending between the upper and lower substrates in order to make contact to the unexposed upper bus bar 603.

FIG. 6C also shows that the circuit board can have two surfaces, an upper surface 610, and a lower surface 611. The circuit board upper surface 610 can make electrical contact with the upper bus bar 603, and the circuit board lower surface 611 can make electrical contact with the lower bus bar 604.

For clarity in FIG. 6C, the upper and lower sense voltage terminals and the upper and lower sequestration terminals are not shown, but it should be understood that they can make connection to the upper and lower surfaces of the circuit board 609 in a similar configuration as the upper and lower bus bars. Referring back to FIG. 6B, it is clear that the upper and lower sense voltage terminals, and the upper and lower sequestration terminals, can connect to the circuit board 609 in a similar configuration as the upper and lower bus bars.

In some embodiments, before the substrates are laminated together, the circuit board 609 is electrically connected to the elements that will be unexposed after the substrates are laminated together. In the embodiment in FIG. 6C, the circuit board 609 can be electrically connected to the upper bus bar 603 on the upper substrate 601 before the upper substrate 601 and lower substrate 602 are assembled together. Then, after the upper substrate 601 and lower substrate 602 are assembled together, the circuit board 609 can be connected to the lower bus bar 604.

Figure 7A:
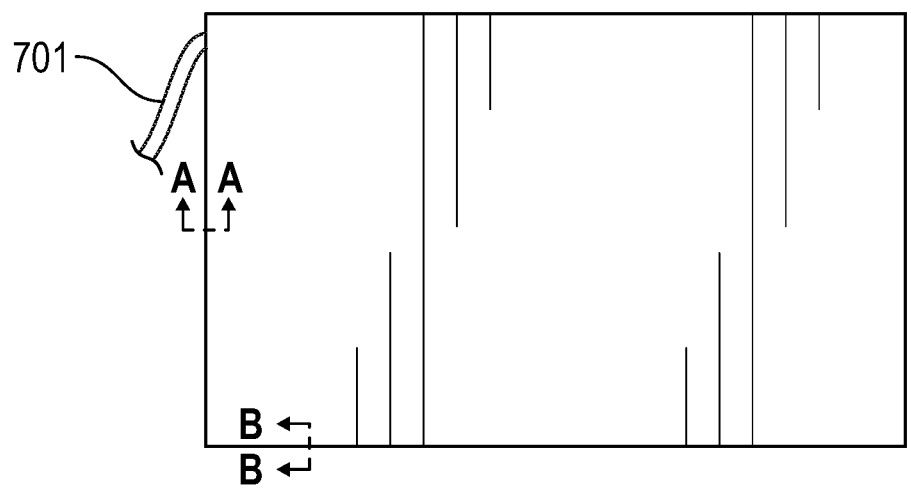
FIG. 7A is a top-down view of an electrochromic device in accordance with some embodiments.
Figure 7B:
FIG. 7B is a side view of an electrochromic device in accordance with some embodiments.

FIG. 7A shows a top-down view of an electrochromic device (e.g., element 1 in FIG. 6A), in an embodiment. In this embodiment, the electrochromic device is approximately a rectangle with dimensions 833 cm×1343 cm, but this is not mean to be limiting. The electrochromic device can have a shape other than a rectangle, or be a rectangle of many other dimensions. FIG. 7A also shows a cable harness 701, which is a cable that is electrically connected to the circuit board. In some cases, the cable harness can be terminated on one end with a connector that is electrically connected to the circuit board. The cable harness 701 can connect the circuit board to the controller assembly, driver and/or power supply to control and provide power to the electrochromic device. FIG. 7B shows a side view of an electrochromic device in an embodiment. FIGS. 7A and 7B show cut-lines A-A, B-B and C-C, which will be referred to in subsequent figures.

Figure 8:
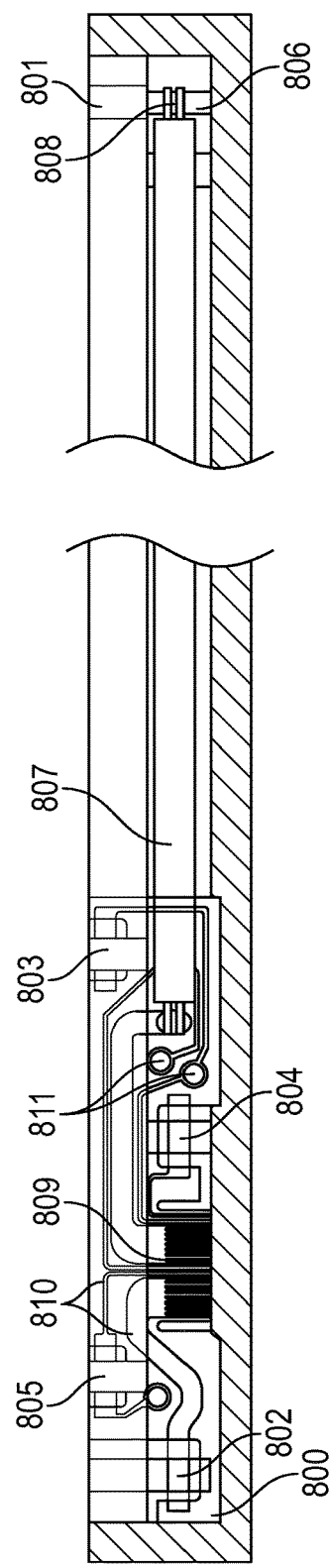
FIG. 8 is a top-down view of an electrochromic device, showing the circuit board and electrical connections to different terminals in accordance with some embodiments.

FIG. 8 shows a top-down view along cut-line C-C in FIG. 7B, that is rotated 90 degrees counterclockwise from the orientation shown in FIG. 7B. The circuit board and connections in FIG. 8 are similar to those shown in FIGS. 4A and 4B, but shows a different embodiment of the circuit board, terminals and electrical connections. The embodiment in FIG. 8 shows that the upper substrate is offset in a lateral direction from the lower substrate along one edge of the electrochromic device. In this embodiment, the lower bus bar terminal 802, lower sense voltage terminal 804 and lower sequestration terminal 806 are exposed by the upper substrate being offset in the lateral direction from the lower substrate.

In the embodiment in FIG. 8, the circuit board 800 extends in between the upper and lower substrates and beyond one edge of the upper substrate. Since the circuit board extends in between the upper and lower substrates, the circuit board 800 can make direct electrical contact to the upper sense voltage terminal 803 and the upper sequestration terminal 805, even though they are unexposed after the upper and lower substrates are assembled together. In some embodiments, the circuit board is long enough to make direct contact to all of the terminals. However, in the embodiment shown in FIG. 8, the circuit board 800 is not long enough to make a direct connection to the upper bus bar terminal 801, or the lower sequestration terminal 806. Furthermore, since the upper bus bar terminal is unexposed after the upper and lower substrates are assembled together, in this embodiment an additional conductive member 808 (a copper ribbon) is used to extend the upper bus bar 801 beyond the edge of the upper substrate. In this embodiment, therefore, a conductive member 807 is required to connect the upper bus bar copper ribbon 808 and the lower sequestration terminal 806 to the circuit board 800. In this embodiment, the conductive member 807 is a pair of flexible ribbon cables making independent connections between the upper bus bar copper ribbon 808 and the circuit board 800, and between the lower sequestration terminal 806 and the circuit board 800. The ribbon cables making up conductive member 807 are stacked on top of one another, and therefore in FIG. 8, the flexible ribbon cable connecting the upper bus bar copper ribbon 808 and the circuit board 800 is visible, and the flexible ribbon cable connecting the lower sequestration terminal 806 and the circuit board 800 is hidden. The two flexible ribbon cables making up the conductive member 807 are electrically isolated from each other so that the upper bus bar and the lower sequestration terminal can be independently addressed.

FIG. 8 shows an embodiment where the circuit board 800 has an upper surface and a lower surface with electrical connections made on the upper surface and lower surface. In this embodiment, there are conductive wires, which are considered to be part of the circuit board, and there are notches in the insulative material of the circuit board, which expose portions of some of the wires so that electrical connections can be made on the upper surface and the lower surface of the circuit board. In this embodiment, the lower bus bar 802 and the lower sense voltage terminal 804 are electrically connected to the lower surface of the circuit board 800, and the upper sense voltage terminal 803, the upper sequestration terminal 805, and the flexible ribbon cables making up the conductive member 807, are electrically connected to the upper surface of the circuit board.

FIG. 8 shows an embodiment of the circuit board 800, showing the connector leads 809. The connector leads are configured to connect to a connector of a cable harness (as shown in element 701 in FIG. 7A). The circuit board 800 has a number of conductive traces 810 connecting the bus bar terminals, sense voltage terminals, and sequestration terminals to the connector leads 809, such that each of the bus bar terminals, sense voltage terminals, and sequestration terminals can be independently addressed by the driver. The conductive traces 810 on the circuit board 800 connecting the bus bar terminals 802 and 801 to the connector leads are wider than the conductive traces 810 between the sense voltage terminals 803 and 804 and sequestration terminals 805 and 806 and the connector leads 809 because the bus bars supply high currents required to switch the electrochromic device, while the sense voltage terminals and sequestration terminals carry lower currents. In some embodiments, the connector leads 809 are configured to interface with a standard connector (e.g., a ZIF connector) and multiple leads are tied together in order to carry the current required by the electrochromic device bus bars. The circuit board can be designed to supply current to the bus bars of the electrochromic device that are greater than 200 mA, or greater than 500 mA, or greater than 1000 mA, or greater than 1500 mA, or greater than 2000 mA, or greater than 2500 mA, or greater than 3000 mA, or from 200 mA to 5000 mA, or from 200 mA to 3000 mA, or from 500 mA to 3000 mA, or from 500 mA to 2000 mA.

FIG. 8 shows an embodiment of the circuit board, where there are a number of test pads 811 that remain exposed after the upper substrate and lower substrate are assembled together. These test pads enable electrical probing of the unexposed connections for testing purposes after the upper and lower substrates are assembled and after the circuit board and other conductive members are assembled and connected.

Electrochromic Device Assemblies with Carrier Glass

Figure 9:
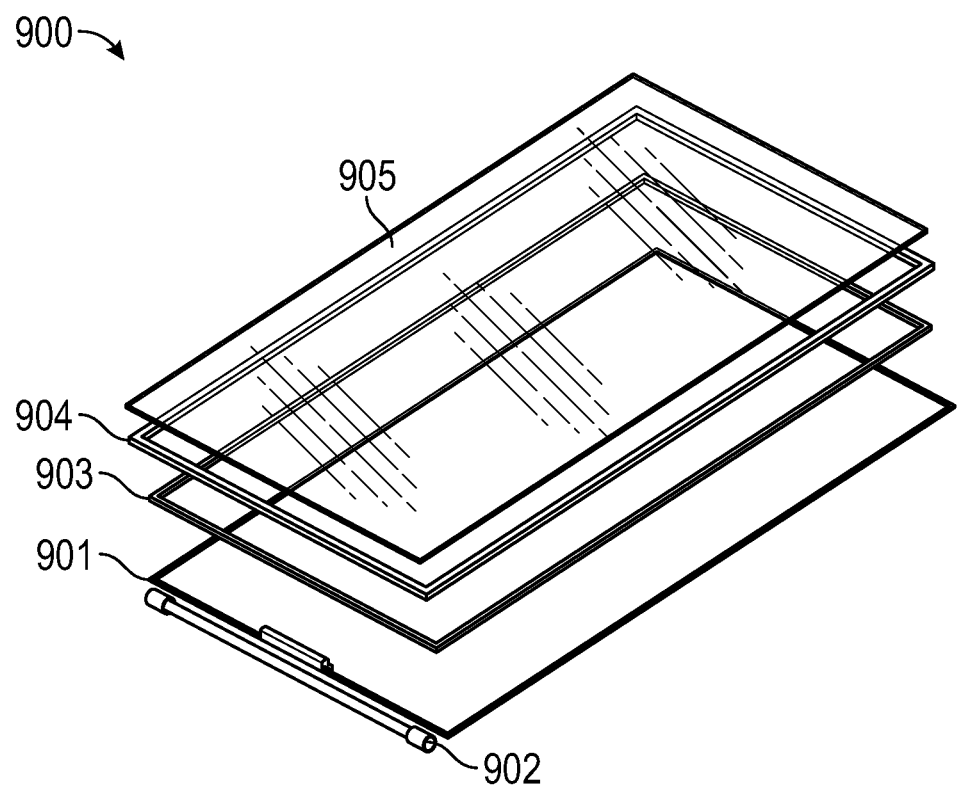
FIG. 9 is a perspective exploded view of an integrated glazing unit (IGU), showing an electrochromic device and carrier glass, flex circuit, spacer, sealant, and glass lite in accordance with some embodiments.

FIG. 9 shows an embodiment of an integrated glazing unit (IGU) 900. Some of the elements of the IGU are shown in the figure including the electrochromic device and carrier glass 901, circuit board or flex circuit 902, spacer 903, sealant 904 and the glass lite 905. In the embodiment shown the electrochromic device is attached to a carrier glass.

The carrier glass can be laminated to the electrochromic device, and can provide increased strength. In some embodiments, the substrate used as the substrate for the electrochromic device can be a type of glass that lacks the strength necessary for certain applications, and laminating or otherwise attaching the electrochromic device to one or more pieces of stronger carrier glass can increase the strength of the assembly and enable the electrochromic device to be used in various applications (e.g., windows in buildings or interior partitions). In such cases, one or both substrates of the electrochromic device could be laminated to annealed, strengthened, or tempered carrier glass to increase the strength of the electrochromic device and carrier glass laminate. In some embodiments, one or both electrochromic device substrates are laminated to carrier glass and one or both electrochromic device substrates have a greater than 90% probability of withstanding a thermal stress or withstand a thermal edge stress less than 100 MPa, or less than 80 MPa, or less than 60 MPa, or less than 50 MPa, or less than 40 MPa, or less than 35 MPa, or less than 30 MPa, or less than 25 MPa, or less than 20 MPa, or less than 15 MPa, or less than 10 MPa, or from 5 to 100 MPa, or from 5 to 80 MPa, or from 5 to 60 MPa, or from 5 to 50 MPa, or from 5 to 40 MPa, or from 5 to 30 MPa, or from 5 to 25 MPa, or from 5 to 20 MPa, or from 5 to 15 MPa.

In some embodiments, the carrier glass enables the use of various materials and manufacturing methods for producing the electrochromic device. For example, the glass for the substrate of the electrochromic device could not be heat strengthened or tempered, and therefore lack the strength (or edge strength) necessary for use in some applications. Alternatively, the electrochromic device could be on a non-glass flexible substrate such as a polymer or plastic. In some embodiments, one or both electrochromic device substrates are glass with sodium oxide (e.g., $Na_2O$) mole fraction less than 0.1%, or less than 1%, or less than 5%, or less than 10%, or from 0.0001% to 1%, or from 0.0001% to 5%, or from 0.0001% to 10%. In some embodiments one or both of the electrochromic device substrates are annealed glass with sodium oxide (e.g., $Na_2O$) mole fraction less than 0.1%, or less than 1%, or less than 5%, or less than 10%, or from 0.0001% to 1%, or from 0.0001% to 5%, or from 0.0001% to 10%. In some embodiments one or both of the electrochromic device substrates are glass with a boron oxide (e.g., $B_2O_3$) mole fraction greater than 0.1%, or greater than 1%, or greater than 5%, or from 0.1% to 20%, or from 0.1% to 15%, or from 0.1% to 10%. In some embodiments, one or both electrochromic device substrates are annealed glass with boron oxide (e.g., $B_2O_3$) mole fraction greater than 0.1%, or greater than 1%, or greater than 5%, or from 0.1% to 20%, or from 0.1% to 15%, or from 0.1% to 10%. In some embodiments, one or both electrochromic device substrates are glass or strengthened glass (such as annealed or tempered) with a coefficient of thermal expansion (between about 20° C. and 300° C.) less than 8 ppm/K, or less than 7 ppm/K, or less than 6 ppm/K, or less than 5 ppm/K, or less than 4 ppm/K, or from 2 to 8 ppm/K, or from 2 to 7 ppm/K, or from 2 to 6 ppm/KL, or from 3 to 6 ppm/K. In some embodiments, one or both electrochromic device substrates are thinner than 4 mm, or thinner than 3 mm, or thinner than 2 mm, or thinner than 1.5 mm, or thinner than 1.25 mm, or thinner than 1 mm, or thinner than 0.8 mm, or thinner than 0.6 mm, or from 0.3 mm to 4 mm, or from 0.3 mm to 3 mm, or from 0.3 mm to 2 mm, or from 0.3 mm to 1.5 mm, or from 0.3 mm to 1 mm, or from 0.5 mm to 4 mm, or from 0.5 mm to 3 mm, or from 0.5 mm to 2 mm, or from 0.5 mm to 1.5 mm, or from 0.5 mm to 1 mm. In one particular embodiment, the substrates used for the electrochromic device may be a low CTE (coefficient of thermal expansion) borosilicate glass having a density of approximately 2.2 g/cu-cm and has a thickness of less than about 1.0 mm, and may have a thickness of less than about 0.5 mm.

One or both substrates of the electrochromic device could be laminated to thicker annealed, strengthened, or tempered carrier glass to increase the strength of the electrochromic device and carrier glass laminate. The thickness of the carrier glass may be greater than 1.0 mm, or within a range of about 0.5 mm to 10 mm. For most residential applications the thickness of the carrier glass may be approximately 3.0 mm and for most commercial applications the thickness of the carrier glass may be approximately 6.0 mm. In some embodiments, the first pane of glass comprises strengthened soda lime glass having a thickness in the approximate range of about 3.0 mm to about 6.0 mm.

Figure 10A:
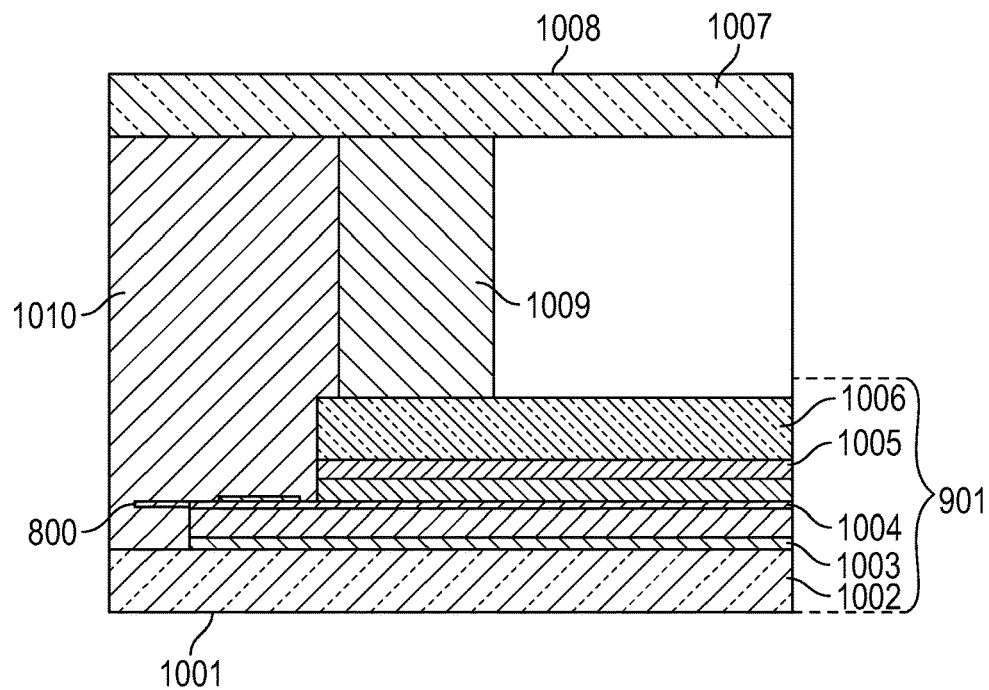
FIG. 10A is a cross-section view of an electrochromic device assembly (in this case, an integrated glass unit) along cut-line A-A in FIG. 7A, showing an electrochromic device, carrier glass, flex circuit, spacer, sealant, and glass lite in accordance with some embodiments.
Figure 10B:
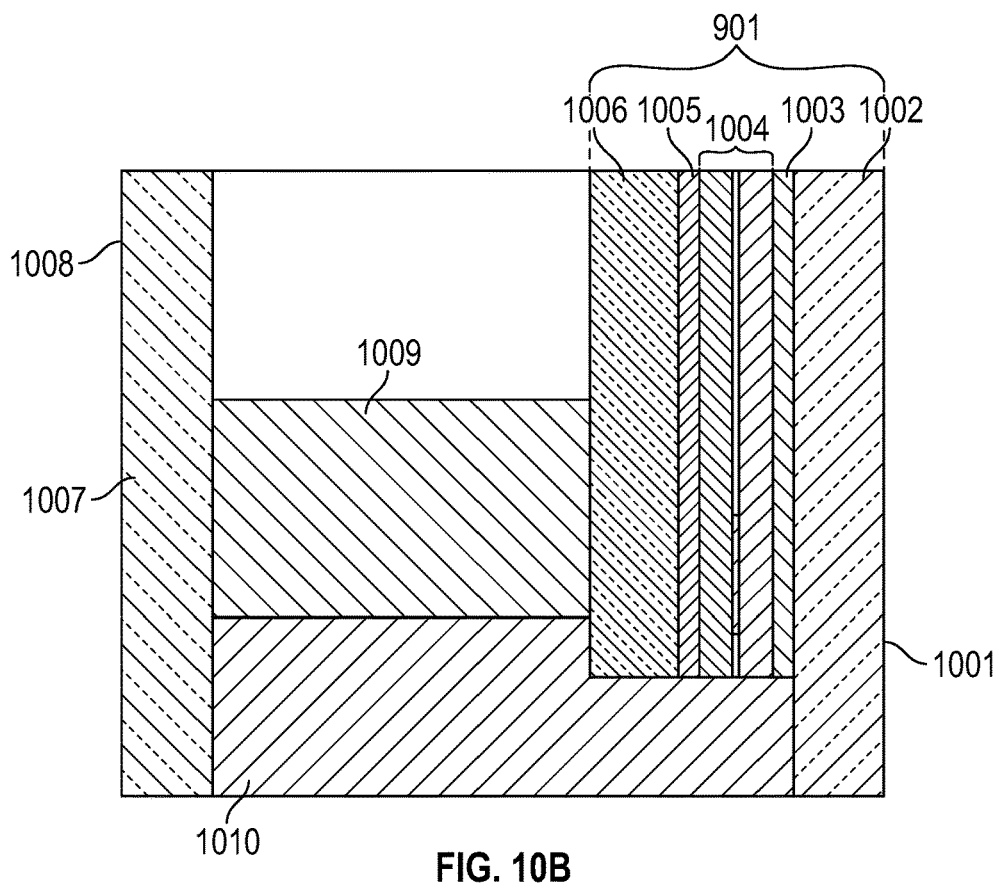
FIG. 10B is a cross-section view of an electrochromic device assembly (in this case (an integrated glass unit) along cut-line B-B in FIG. 7A, showing the electrochromic device, carrier glass, spacer, sealant, and a glass lite in accordance with some embodiments.

FIGS. 10A and 10B show cross-sections along different cut-lines of an embodiment of an electrochromic device integrated glazing unit (IGU) with carrier glass. The dimensions in FIG. 10A is in millimeters, and are exemplary of one specific example and therefore not meant to be limiting. In other embodiments, the dimensions can change without impacting the concepts in this disclosure. This embodiment shows one electrochromic device 1004 laminated to two pieces of carrier glass 1002 and 1006 in an IGU. In another embodiment, the electrochromic device 1004 could be laminated to one piece of carrier glass 1002 in an IGU, and the other piece of carrier glass 1006 can be omitted. In another embodiment, the electrochromic device 1004 could be laminated to one piece of carrier glass 1006 in an IGU, and the other piece of carrier glass 1002 can be omitted.

FIG. 10A shows a cross-section along cut-line A-A in FIG. 7A of an embodiment of one electrochromic device 1004 incorporated into an integrated glazing unit. In this embodiment, the electrochromic device is laminated to two pieces of carrier glass 1002 and 1006. In this embodiment, the electrochromic device is laminated to the carrier glass with polyvinyl butyral (PVB) layers 1003 and 1005. In other embodiments, different materials can be used to laminate the electrochromic device to the carrier glass, such as ethylene vinyl acetate (EVA),) layer, polyurethane (PU), an ultraviolet activated adhesive, or other transparent or translucent bonding material.

In the embodiment shown in FIG. 10A, the device and carrier glass (e.g., 901 in FIG. 9) are incorporated in the IGU with a spacer 1009 and a secondary sealant 1010. The spacer 1009 and the secondary sealant 1010 serve to connect the electrochromic device and carrier glass to the glass lite 1007, while maintaining a thermally insulating space in between. The secondary sealant in this example is silicone although the secondary sealant may be any sealant material with low water permeability FIG. 10B shows a cross-section of the same embodiment of an electrochromic device 1004 incorporated into an integrated glazing unit shown in FIG. 10A, but along cut-line B-B in FIG. 7A.

The embodiment shown in FIGS. 10A and 10B have a number of layers, summarized below. The first carrier glass 1002 is attached to the electrochromic device laminated assembly 1004 by a layer of PVB 1003. The electrochromic device 1004 is attached to the second carrier glass 1006 by a layer of PVB 1005. The first carrier glass 1002, electrochromic device laminated assembly 1004, second carrier glass 1006 assembly is attached to the glass lite 1007 of the IGU by a spacer 1009 and a silicone secondary sealant 1010. In other embodiments, the layers of silicone and/or PVB can be other materials used to laminate or attach the layers to one another. The electrochromic device laminated assembly 1004 also has a number of layers including a first substrate, a first transparent conductive layer on the first substrate, a first bus bar making electrical contact to the first transparent conductive layer, a second substrate, a second transparent conductive layer on the second substrate, a second bus bar making electrical contact to the second transparent conductive layer, and at least one layer of electrochromic material. In some embodiments, there is a first electrochromic material applied to the first transparent conductive layer on the first substrate, a second electrochromic material applied to the second transparent conductive layer on the second substrate, and an ion conducting layer between the electrochromic materials. In some embodiments, the ion conducting layer is used to laminate the first substrate, transparent conducting layer and electrochromic material to the second substrate, transparent conducting layer and electrochromic material to form the electrochromic device laminated assembly. In some embodiments of the electrochromic device laminated assembly, a portion of a first edge of the second substrate is recessed relative to at least a portion of a first edge of the first substrate, exposing at least a portion of the first bus bar for electrical connection. The circuit board or flex circuit 800 is used to make connection to the first and second bus bars of the electrochromic device. In some embodiments, the circuit board or flex circuit 800 is also used to make electrical connection to other terminals (e.g., sense voltage and sequestration terminals) of the electrochromic device.

In the embodiment shown in FIGS. 10A and 10B, the two substrates of the electrochromic device 1004 are offset from one another in one lateral direction. This offset exposes the contacts on one of the substrates of the electrochromic device and allows a circuit board (or, flex circuit 800) to connect to the exposed contacts.

In the embodiment shown in FIGS. 10A and 10B, the carrier glass 406 that is attached to the glass lite 1007 with the spacer 1009 and the secondary sealant 1010 and the glass lite are offset from each other in one lateral direction. This makes it necessary for the spacer and/or secondary sealant to contact more surfaces than the surface of the carrier glass 1006. In the embodiment shown in FIG. 10A, the secondary sealant contacts at least one surface of the carrier glass 1006 and the surface of carrier glass 1002. In the embodiment shown in FIG. 10A, the secondary sealant also contacts the flex circuit 800. In this embodiment, the secondary sealant also therefore serves the purpose of protecting the circuit board or flex circuit from the environment. In this case, the integrated glazing unit has a first pane of glass or plastic (e.g., carrier glass 1006 in FIG. 10A) attached to one of the substrates of the electrochromic device laminated assembly, and a second pane of glass or plastic (e.g., glass lite 1007 in FIG. 10A) attached by a spacer to the first pane of glass or plastic, and the first pane of glass or plastic is not offset in a lateral direction from the first edge of one or both substrates in the electrochromic device, such that the first pane of glass or plastic and the second pane of glass or plastic are offset in a lateral direction on at least one edge.

In some embodiments, the carrier glass that is attached to the glass lite with the spacer and the secondary sealant and the glass lite (e.g., 1006 and 1007 in FIG. 10A) are laterally aligned with one another such that the spacer and secondary sealant only contact one of the carrier glass pieces and the glass lite (and not both carrier glass pieces and/or the electrochromic device). In this case, the integrated glazing unit has a first pane of glass or plastic (e.g., carrier glass 1006 in FIG. 10A) attached to one of the substrates of the laminated assembly; and a second pane of glass or plastic (e.g., glass lite 1007 in FIG. 10A) attached by a spacer to the first pane of glass or plastic, and the first pane of glass or plastic is offset in a lateral direction from the first edge of one or both substrates in the electrochromic device, such that the first pane of glass or plastic and the second pane of glass or plastic are not offset in any lateral direction on any edge. In some cases, the spacer and secondary sealant lie on planar surfaces on both the carrier glass and the glass lite. In some cases, the spacer and secondary sealant only contact one surface of the carrier glass and one surface of the glass lite.

In any of the electrochromic device assemblies in this disclosure (i.e., IGUs or LGUs), the electrochromic device can be laminated to one or more pieces of carrier glass, and the one or more pieces of carrier glass can be patterned with ceramic frit. The ceramic frit can be applied using a screen printing process, and then fired within a furnace to fuse the ceramic frit coating to the glass. The ceramic frit can be colored. The ceramic frit can be applied in a regular or irregular pattern, or applied around the border of the electrochromic device assembly. In some embodiments, the ceramic frit is used to visually obscure the electrical connections, circuit board and/or controller assembly at the edge of the assembly. The furnace used to fire the ceramic frit can be a tempering furnace. The temperature of the firing process can be greater than 400° C., or greater than 450° C., or greater than 500° C., or greater than 550° C., or greater than 600° C., or greater than 650° C., or greater than 700° C., or from 600° C. to 800° C., or from 500° C. to 800° C., or from 600° C. to 800° C., or from 400° C. to 900° C., or from 500° C. to 900° C., or from 600° C. to 900° C. In some cases, the ceramic frit firing process reaches a sufficient temperature (e.g., greater than 600° C.), and a rapid cooling rate is used, and the carrier glass is annealed, heat strengthened, or tempered in the process.

In some embodiments, one or more electrochromic devices are laminated together, and laminated to one or more pieces of carrier glass, and this entire laminated assembly is symmetric along the direction perpendicular to the main body of the laminated assembly. In some embodiments, a symmetric laminated assembly is advantageous because it may reduce or eliminate bowing during lamination. Not to be limited by theory, bowing may occur when there are materials with different coefficients of thermal expansion in an asymmetric assembly such that the expansion and contraction of one side of the assembly is different from the opposing side of the assembly leading to residual stress and bowing.

Multiple Electrochromic Device Integrated Glazing Unit (IGU) Construction

Figure 11A:
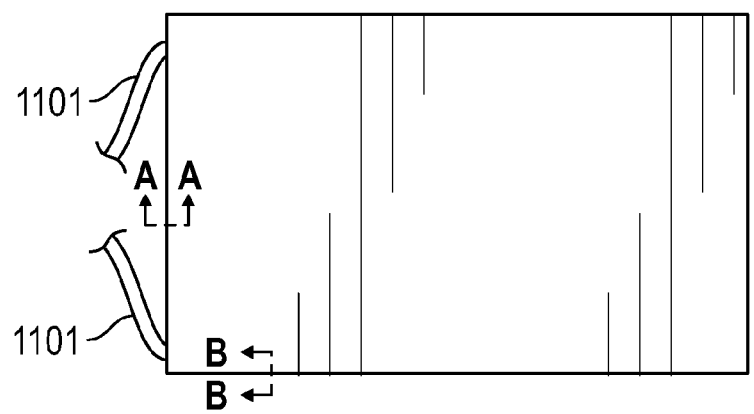
FIG. 11A is a top-down view of an electrochromic device assembly in accordance with some embodiments.
Figure 11B:
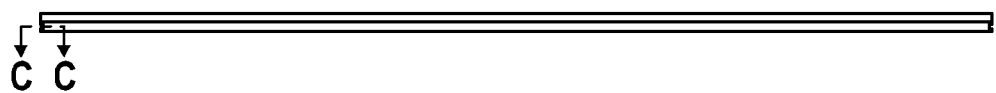
FIG. 11B is a side view of an electrochromic device assembly in accordance with some embodiments.

FIG. 11A shows a top-down view of an electrochromic device 1, in an embodiment. In this embodiment, the electrochromic device is approximately a rectangle with dimensions 833 cm×1343 cm, but this is not meant to be limiting. The electrochromic device can have a shape other than a rectangle, or be a rectangle of many other dimensions. The embodiment shown in FIGS. 11A and 11B has two electrochromic devices incorporated into one assembly (e.g., an IGU). Therefore, FIG. 11A shows two cable harnesses 1101, one of which is electrically connected to the circuit board on the first electrochromic device, and the other of which is electrically connected to the circuit board on the second electrochromic device. In some cases, the cable harnesses can be terminated with connectors that are electrically connected to each circuit board. The cable harnesses 1101 connect the circuit boards to one or more controller assemblies, drivers and/or power supplies to control and provide power to the electrochromic devices. FIG. 11B shows a side view of an electrochromic device in an embodiment. FIGS. 11A and 11B show cut-lines A-A, B-B and C-C, which will be referred to in subsequent figures.

Figure 12A:
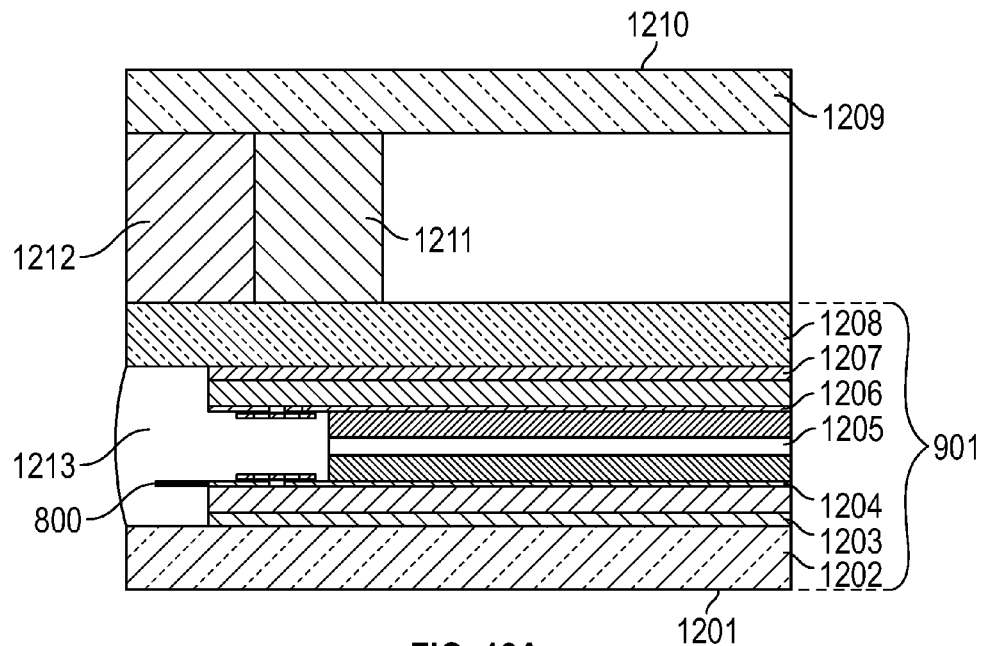
FIG. 12A is a cross-section view of an electrochromic device assembly (in this case, an integrated glass unit) along cut-line A-A in FIG. 11A, showing two electrochromic devices, carrier glass, flex circuit, spacer, sealant, and glass lite in accordance with some embodiments.
Figure 12B:
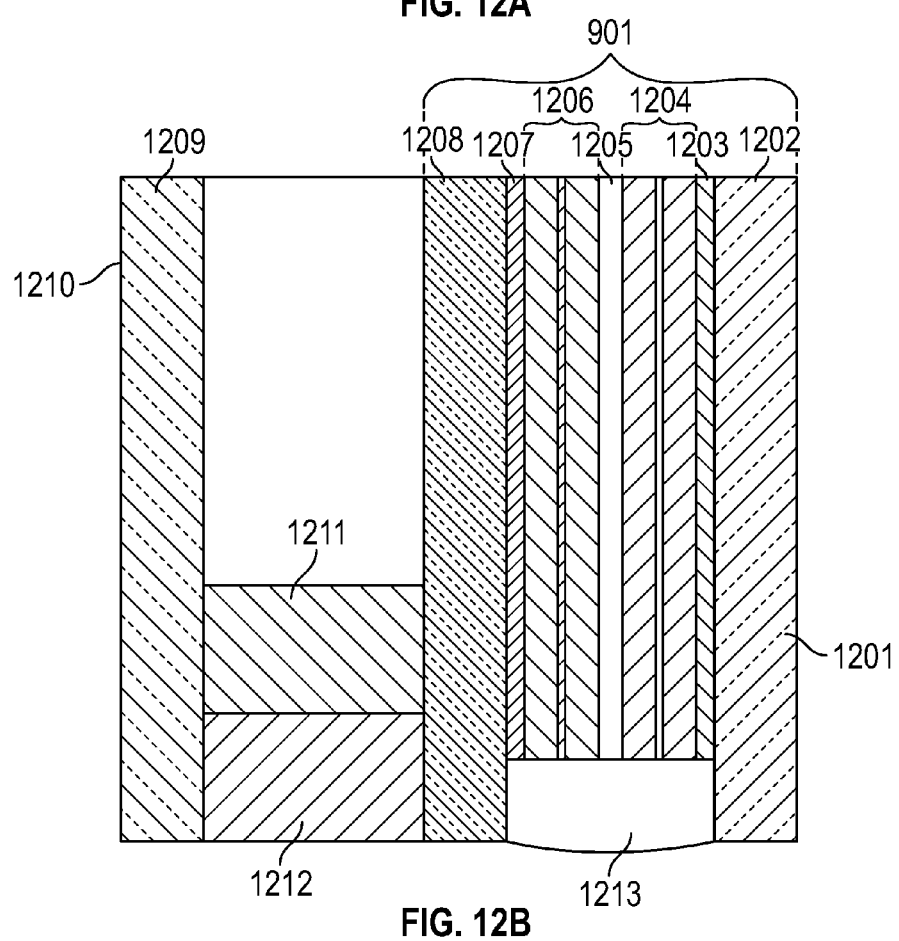
FIG. 12B is a cross-section view of an electrochromic device assembly (in this case, an integrated glass unit) along cut-line B-B in FIG. 11A, showing two electrochromic devices, carrier glass, spacer, sealant, and a glass lite in accordance with some embodiments.
Figure 13A:
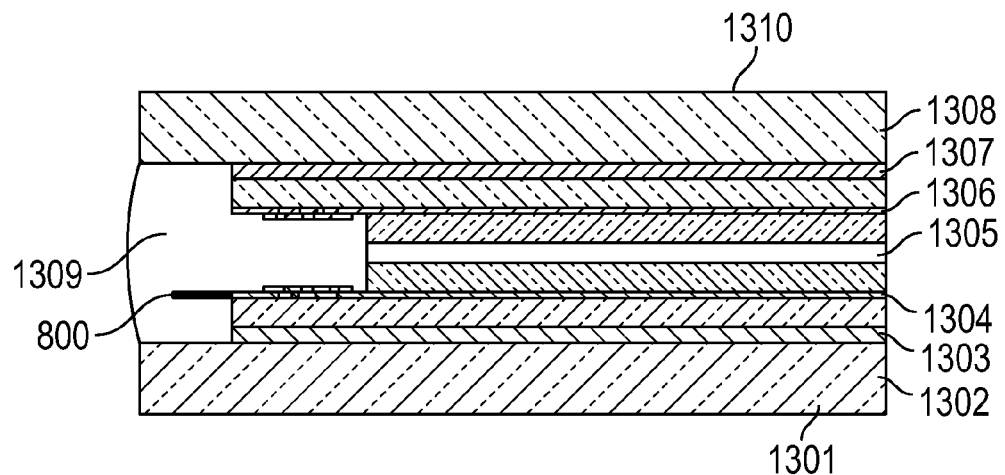
FIG. 13A is a cross-section view of an electrochromic device assembly (in this case, a laminated glass unit) along cut-line A-A in FIG. 11A, showing two electrochromic devices, and two pieces of carrier glass in accordance with some embodiments.
Figure 13B:
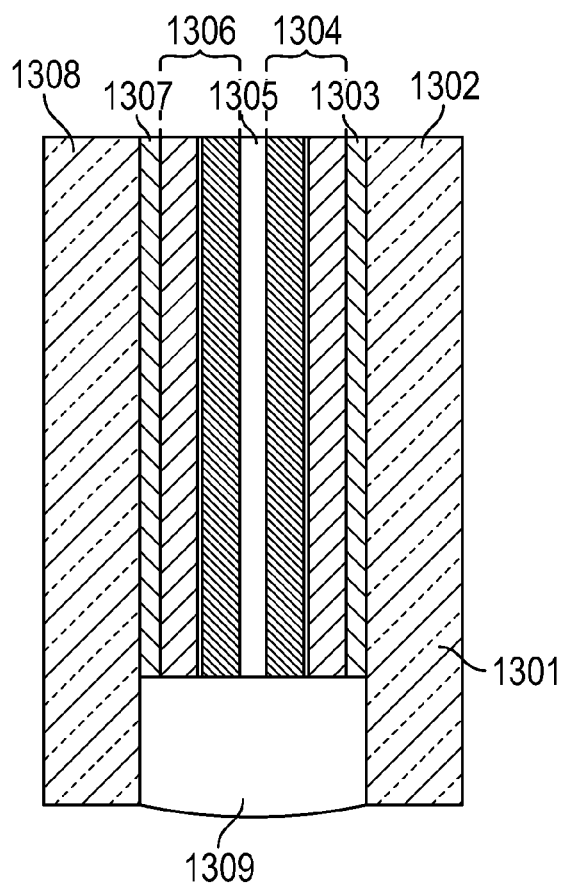
FIG. 13B is a cross-section view of an electrochromic device assembly (in this case, a laminated glass unit) along cut-line B-B in FIG. 11A, showing two electrochromic devices, and two pieces of carrier glass in accordance with some embodiments.

FIGS. 12A and 12B show cross-sections along different cut-lines of an embodiment of an electrochromic device integrated glazing unit with carrier glass. The dimensions in FIG. 12A is in millimeters, and are exemplary of one specific example. In other embodiments, the dimensions can change without impacting the concepts in this disclosure. This embodiment shows two electrochromic devices 1204, 1206 laminated to each other, and two pieces of carrier glass 1202, 1208 in an IGU. In another embodiment, the electrochromic devices 1204, 1206 could be laminated to each other and to one piece of carrier glass 1202 in an IGU, and the other piece of carrier glass 1208 can be omitted. In another embodiment, the electrochromic devices 1204, 1206 could be laminated to each other and to one piece of carrier glass 1208 in an IGU, and the other piece of carrier glass 1202 can be omitted.

FIG. 12A shows a cross-section along cut-line A-A in FIG. 11A of an embodiment of two electrochromic devices 1204 and 1206 incorporated into an integrated glazing unit. In this embodiment, the electrochromic devices are laminated to each other and to two additional pieces of carrier glass 1202 and 1208. In this embodiment, the electrochromic devices are laminated to each other and to the carrier glass with polyvinyl butyral (PVB) layers 1203, 1205 and 1207. In other embodiments, different materials can be used to laminate the electrochromic devices each other and to the carrier glass, such as ethylene vinyl acetate (EVA),) layer, polyurethane (PU), an ultraviolet activated adhesive, or other transparent or translucent bonding material.

In the embodiment shown in FIG. 12A, the devices and carrier glass (e.g., 1001 in FIG. 9) are incorporated in the IGU with a spacer 1211 and a secondary sealant 1212. The spacer 1211 and the secondary sealant 1212 serve to connect the electrochromic device and carrier glass to the glass lite 1209, while maintaining a thermally insulating space in between. The secondary sealant in this example is silicone. There is also an additional environmental protection element 1213 protecting the electrochromic devices and circuit boards, or the electrochromic devices and flex circuits, from the environment. In this example, the environmental protection element is made of silicone as well. In other embodiments, the secondary sealant and/or environmental protection element could be any material with low water permeability.

FIG. 12B shows a cross-section of the same embodiment of two electrochromic devices 1204 and 1206 incorporated into an integrated glazing unit shown in FIG. 12A, but along cut-line B-B in FIG. 11A.

The embodiment shown in FIGS. 12A and 12B have a number of layers, summarized below. The first carrier glass 1202 is attached to the first electrochromic device laminated assembly 1204 by a layer of PVB 1203. The first electrochromic device 1204 is attached to the second electrochromic device 1206 by a layer of PVB 1205. The second electrochromic device 1206 is attached to the second carrier glass 1208 by a layer of PVB 1207. The carrier glass 1202, first electrochromic device laminated assembly 1204, second electrochromic device laminated assembly 1206, carrier glass 1208 assembly is attached to the glass lite 1209 of the IGU by a spacer 1211 and a silicone secondary sealant 1212. There is also a silicone environmental protection element 1213 protecting the electrochromic device assemblies from the environment. In other embodiments, the layers of silicone and/or PVB can be other materials used to laminate or attach the layers to one another. The electrochromic device laminated assemblies 1204 and 1206 also each have a number of layers including a first substrate, a first transparent conductive layer on the first substrate, a first bus bar making electrical contact to the first transparent conductive layer, a second substrate, a second transparent conductive layer on the second substrate, a second bus bar making electrical contact to the second transparent conductive layer, and at least one layer of electrochromic material. In some embodiments, there is a first electrochromic material applied to the first transparent conductive layer on the first substrate, a second electrochromic material applied to the second transparent conductive layer on the second substrate, and an ion conducting layer between the electrochromic materials. In some embodiments, the ion conducting layer is used to laminate the first substrate, transparent conducting layer and electrochromic material to the second substrate, transparent conducting layer and electrochromic material to form each of the electrochromic device laminated assemblies. In some embodiments of each of the electrochromic device laminated assemblies, a portion of a first edge of the second substrate is recessed relative to at least a portion of a first edge of the first substrate, exposing at least a portion of the first bus bar for electrical connection. The circuit boards or flex circuits 800 are used to make connection to the first and second bus bars of each electrochromic device. Each electrochromic device has a separate circuit board or flex circuit 800. In one embodiment, each circuit board can have connections similar to those shown in FIG. 8, which in this case can depict one of the circuit boards of one of the devices in the assembly as viewed along cut-line C-C in FIG. 11B. FIG. 12A shows a cross-section of a particular embodiment at a particular cut-line where only one of the flex circuits 800 is visible. In some embodiments, the circuit boards or flex circuits 800 are also used to make electrical connection to other terminals (e.g., sense voltage and sequestration terminals) of each electrochromic device.

In the embodiment shown in FIGS. 12A and 12B, the two substrates of each of the electrochromic devices 1204 and 1206 are offset from one another in one lateral direction, which exposes the contacts on one of the substrates of each of the electrochromic devices and allows a circuit board (or, flex circuit 800) to connect to the exposed contacts on each device. The two devices are then oriented in the IGU such that the exposed contacts face one another. In this case, the exposed contacts of each electrochromic device face away from the carrier glass attached to the electrochromic device (either 1202 or 1208), as shown in FIG. 12A. In some embodiments, the substrates of the electrochromic device laminated assemblies that are farthest apart (i.e., the substrates that are not attached or laminated to one another) are laterally aligned with each other. In some embodiments, the substrates of the electrochromic device laminated assemblies that are closest together (i.e., the substrates that are attached or laminated to one another) are laterally aligned with each other.)

In the embodiment shown in FIGS. 12A and 12B, the carrier glass 1208 that is attached to the glass lite 1209 with the spacer 1211 and the secondary sealant 1212 and the glass lite are laterally aligned with one another such that the spacer 1211 and secondary sealant 1212 only contact carrier glass 1208 and glass lite 1209. In this case, the integrated glazing unit has a first pane of glass or plastic (e.g., carrier glass 1208 in FIG. 12A) attached to one of the substrates of the laminated assembly, and a second pane of glass or plastic (e.g., glass lite 1209 in FIG. 12A) attached by a spacer to the first pane of glass or plastic, and the first pane of glass or plastic is offset in a lateral direction from the first edge of one or both of the substrates in the electrochromic device, such that the first pane of glass or plastic and the second pane of glass or plastic are not offset in any lateral direction on any edge. In some cases, the spacer 1211 and the secondary sealant 1212 lie on planar surfaces on both the carrier glass 1208 and glass lite 1209. In some cases, the spacer 1211 and the secondary sealant 1212 only contact one surface of carrier glass 1208 and one surface of glass lite 1209.

In some embodiments, the carrier glass that is attached to the glass lite with the spacer and the secondary sealant (e.g., 1208 and 1209 in FIG. 12A) and the glass lite are offset from each other in one lateral direction. This makes it necessary for the spacer and/or secondary sealant to contact more surfaces than the surface of the carrier glass 1208. In such cases, the secondary sealant can contact at least one surface of the carrier glass 1208 and/or the surface of carrier glass 1202. In some cases, the secondary sealant also contacts the flex circuit 800. In these cases, the secondary sealant also serves the purpose of protecting the circuit board or flex circuit from the environment. In some cases, the integrated glazing unit can have a first pane of glass or plastic (e.g., carrier glass 1208 in FIG. 12A) attached to one of the substrates of the electrochromic device laminated assembly, and a second pane of glass or plastic (e.g., glass lite 1209 in FIG. 12A) attached by a spacer to the first pane of glass or plastic, and the first pane of glass or plastic is not offset in a lateral direction from the first edge of one or both substrates in the electrochromic device, such that the first pane of glass or plastic and the second pane of glass or plastic are offset in a lateral direction on at least one edge.

Electrochromic Device Laminated Glazing Unit (LGU) Construction with Carrier Glass FIGS. 13A and 13B show cross-sections along different cut-lines of an embodiment of an electrochromic device laminated glass unit (LGU) with carrier glass. In this embodiment, two electrochromic devices 1303, 1306 are laminated to each other and to two pieces of carrier glass 1302, 1308. In another embodiment, one electrochromic device 1304 can be laminated to two pieces of carrier glass 1302, 1308 in an LGU, and the other electrochromic device 1306 can be omitted.

FIG. 13A shows a cross-section (analogous to being along cut-line A-A in FIG. 11A) of an embodiment of two electrochromic devices 1304 and 1306 incorporated into a laminated glazing unit (LGU). In this embodiment, the electrochromic devices are laminated to each other and to two additional pieces of carrier glass 1302 and 1308. In this embodiment, the electrochromic devices are laminated to each other and to the carrier glass with polyvinyl butyral (PVB) layers 1303, 1305 and 1307. In other embodiments, different materials can be used to laminate the electrochromic devices each other and to the carrier glass, such as ethylene vinyl acetate (EVA),) layer, polyurethane (PU), an ultraviolet activated adhesive, or other transparent or translucent bonding material.

In the embodiment shown in FIG. 13A, the devices and carrier glass are incorporated in the LGU with the carrier glass 1302 and 1308 forming the outside major surfaces of the LGU. There is also an environmental protection element 1309 protecting the electrochromic devices and circuit boards, or the electrochromic devices and flex circuits, from the environment. In this example, the environmental protection element is made of silicone. In other embodiments, the secondary sealant and/or environmental protection element could be a different material with low water permeability.

FIG. 13B shows a cross-section of the same embodiment of two electrochromic devices 1304 and 1306 incorporated into a laminated glass unit shown in FIG. 13A, but along cut-line B-B in FIG. 11A.

The embodiment shown in FIGS. 13A and 13B have a number of layers, summarized below. The first carrier glass 1302 is attached to the first electrochromic device laminated assembly 1304 by a layer of PVB 1303. The first electrochromic device 1304 is attached to the second electrochromic device 1306 by a layer of PVB 1305. The second electrochromic device 1306 is attached to the second carrier glass 1308 by a layer of PVB 1307. There is also a silicone environmental protection element 1309 protecting the electrochromic device assemblies from the environment. In other embodiments, the layers of silicone and/or PVB can be other materials used to laminate or attach the layers to one another. The electrochromic device laminated assemblies 1304 and 1306 also each have a number of layers including a first substrate, a first transparent conductive layer on the first substrate, a first bus bar making electrical contact to the first transparent conductive layer, a second substrate, a second transparent conductive layer on the second substrate, a second bus bar making electrical contact to the second transparent conductive layer, and at least one layer of electrochromic material. In some embodiments, there is a first electrochromic material applied to the first transparent conductive layer on the first substrate, a second electrochromic material applied to the second transparent conductive layer on the second substrate, and an ion conducting layer between the electrochromic materials. In some embodiments, the ion conducting layer is used to laminate the first substrate, transparent conducting layer and electrochromic material to the second substrate, transparent conducting layer and electrochromic material to form each of the electrochromic device laminated assemblies. In some embodiments of each of the electrochromic device laminated assemblies, a portion of a first edge of the second substrate is recessed relative to at least a portion of a first edge of the first substrate, exposing at least a portion of the first bus bar for electrical connection. The circuit boards or flex circuits 800 are used to make connection to the first and second bus bars of each electrochromic device. Each electrochromic device has a separate circuit board or flex circuit 800. In one embodiment, each circuit board can have connections similar to those shown in FIG. 8, which in this case can depict one of the circuit boards of one of the devices in the assembly as viewed along cut-line C-C in FIG. 11B. FIG. 13A shows a cross-section of a particular embodiment at a particular cut-line where only one of the flex circuits 800 is visible. In some embodiments, the circuit boards or flex circuits 800 are also used to make electrical connection to other terminals (e.g., sense voltage and sequestration terminals) of each electrochromic device.

In the embodiment shown in FIGS. 13A and 13B, the two substrates of each of the electrochromic devices 1304 and 1306 are offset from one another in one lateral direction, which exposes the contacts on one of the substrates of each of the electrochromic devices and allows a circuit board (or, flex circuit 800) to connect to the exposed contacts on each device. The two devices are then oriented in the LGU such that the exposed contacts face one another. In this case, the exposed contacts of each electrochromic device face away from the carrier glass attached to the electrochromic device (for both carrier glass 1302 and 1308), as shown in FIG. 13A.). In some embodiments, the substrates of the electrochromic device laminated assemblies that are farthest apart (i.e., the substrates that are not attached or laminated to one another) are laterally aligned with each other. In some embodiments, the substrates of the electrochromic device laminated assemblies that are closest together (i.e., the substrates that are attached or laminated to one another) are laterally aligned with each other.

In the embodiment shown in FIGS. 13A and 13B, the carrier glass 1302 that is attached to the first electrochromic device 1304 and the carrier glass 1308 that is attached to the second electrochromic device 1306 are laterally aligned with one another. In some embodiments, the carrier glass 1302 that is attached to the first electrochromic device 1304 and the carrier glass 1308 that is attached to the second electrochromic device 1306 are offset from each other in at least one lateral direction.

ADDITIONAL CONSIDERATIONS

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An integrated glazing unit (IGU), comprising:
   a first substrate;
   a first transparent conductive layer on the first substrate;
   a first bus bar applied to the first substrate and the first transparent conductive layer;
   a second substrate;
   a second transparent conductive layer on the second substrate;
   a second bus bar applied to the second substrate and the second transparent conductive layer;
   at least one first layer of electrochromic material;
   a third substrate;
   a third transparent conductive layer on the first substrate;
   a third bus bar applied to the third substrate and the third transparent conductive layer;
   a fourth substrate;
   a fourth transparent conductive layer on the fourth substrate;
   a fourth bus bar applied to the fourth substrate and the fourth transparent conductive layer;
   at least a second layer of electrochromic material;
   a first pane of glass or plastic attached to the first substrate;
   a second pane of glass or plastic attached to the fourth substrate; and
   a third pane of glass or plastic attached by a spacer to the second pane;
   wherein:
   the first substrate, the at least one first layer of electrochromic material, and the second substrate form a laminated assembly, with at least a portion of a first edge of the second substrate recessed relative to at least a portion of a first edge of the first substrate, exposing at least a portion of the first bus bar for electrical connection;
   the third substrate, the at least the second layer of electrochromic material, and the fourth substrate form a second laminated assembly, with at least a portion of a first edge of the third substrate recessed relative to at least a portion of a first edge of the fourth substrate, exposing at least a portion of the third bus bar for electrical connection; and
   the laminated assembly and the second laminated assembly are attached such that the second and fourth substrates are attached and the first and fourth substrates are facing outwards.

2. The integrated glazing unit of claim 1, further comprising:
   a controller assembly located within a volume defined by the laminated assembly, the second pane, and the spacer, and flush with or recessed from an edge of the first pane or the second pane.

3. The integrated glazing unit of claim 1, further comprising:

a flex circuit, coupled to the at least a portion of the first bus bar as the electrical connection, and located along the at least a portion of the first edge of the first substrate, inward of an edge of the integrated glazing unit.

4. The integrated glazing unit of claim 1, further comprising:
one or more sense terminals coupled to the first transparent conductive layer and exposed for electrical connection where the at least a portion of the first edge of the second substrate is recessed relative to the at least a portion of the first edge of the first substrate.

5. The integrated glazing unit of claim 1, further comprising:
one or more charge sequestration terminals coupled to the first transparent conductive layer and exposed for electrical connection where the at least a portion of the first edge of the second substrate is recessed relative to the at least a portion of the first edge of the first substrate.

6. The integrated glazing unit of claim 1, wherein both of the first bus bar and the second bus bar include a solder line, and wherein the exposed at least a portion of the first bus bar includes a portion of the solder line of the first bus bar.

7. The integrated glazing unit of claim 1, further comprising:
one or both of the first substrate and the second substrate having a plurality of tabs with terminals of an electrochromic device thereupon, wherein the at least a portion of the first bus bar is a terminal of the electrochromic device on one of the plurality of tabs, and wherein at least two of the plurality of tabs are at least partially exposed by the first edge of the second substrate recessed relative to the at least a portion of the first edge of the first substrate.

8. The integrated glazing unit of claim 1, further comprising:
a first pane of glass or plastic attached to the second substrate of the laminated assembly; and
a second pane of glass or plastic attached by a spacer to the first pane of glass or plastic; wherein
the first pane of glass or plastic is offset in a lateral direction from the first edge of the second substrate, such that the first pane of glass or plastic and the second pane of glass or plastic are not offset in any lateral direction on any edge.

9. The integrated glazing unit of claim 1, wherein
the second pane of glass or plastic and the third pane of glass or plastic are not offset in any lateral direction on any edge.

10. The integrated glazing unit of claim 1, wherein:
the first and second panes of glass comprise strengthened soda lime glass having a thickness in the approximate range from about 3.0 mm to about 6.0 mm; and
the first, second, third and fourth substrates comprise low CTE borosilicate glass having a thickness of about 0.5 mm.

11. A laminated glass unit (LGU), comprising:
a first substrate;
a first transparent conductive layer on the first substrate;
a first bus bar applied to the first substrate and the first transparent conductive layer;
a second substrate;
a second transparent conductive layer on the second substrate;
a second bus bar applied to the second substrate and the second transparent conductive layer;
at least one layer of electrochromic material;
the first substrate, the at least one layer of electrochromic material, and the second substrate form a laminated assembly, with at least a portion of a first edge of the second substrate recessed relative to at least a portion of a first edge of the first substrate, exposing at least a portion of the first bus bar for electrical connection
a third substrate;
a third transparent conductive layer on the first substrate;
a third bus bar applied to the first substrate and the first transparent conductive layer;
a fourth substrate;
a fourth transparent conductive layer on the second substrate;
a fourth bus bar applied to the second substrate and the second transparent conductive layer;
at least a second layer of electrochromic material;
the third substrate, the at least the second layer of electrochromic material, and the fourth substrate form a second laminated assembly, with at least a portion of a first edge of the third substrate recessed relative to at least a portion of a first edge of the fourth substrate, exposing at least a portion of the third bus bar for electrical connection; and
the laminated assembly and the second laminated assembly are attached such that the second and fourth substrates are attached and the first and fourth substrates are facing outwards, wherein
the second and fourth substrates are not offset in any lateral direction on any edge.

12. The laminated glass unit of claim 11, further comprising:
a flex circuit, coupled to the at least a portion of the first bus bar as the electrical connection, and located along the at least a portion of the first edge of the first substrate, inward of an edge of the laminated glass unit.

13. The laminated glass unit of claim 11, further comprising:
one or more sense terminals coupled to the first transparent conductive layer and exposed for electrical connection where the at least a portion of the first edge of the second substrate is recessed relative to the at least a portion of the first edge of the first substrate.

14. The laminated glass unit of claim 11, further comprising:
one or more charge sequestration terminals coupled to the first transparent conductive layer and exposed for electrical connection where the at least a portion of the first edge of the second substrate is recessed relative to the at least a portion of the first edge of the first substrate.

15. The laminated glass unit of claim 11, wherein both of the first bus bar and the second bus bar include a solder line, and wherein the exposed at least a portion of the first bus bar includes a portion of the solder line of the first bus bar.

16. The laminated glass unit of claim 11, further comprising:
one or both of the first substrate and the second substrate having a plurality of tabs with terminals of an electrochromic device thereupon, wherein the at least a portion of the first bus bar is a terminal of the electrochromic device on one of the plurality of tabs, and wherein at least two of the plurality of tabs are at least partially exposed by the first edge of the second substrate recessed relative to the at least a portion of the first edge of the first substrate.

17. The laminated glass unit of claim 11, further comprising:

a first pane of glass or plastic attached to the first substrate; and a second pane of glass or plastic attached to the fourth substrate.

18. The laminated glass unit of claim 17, wherein:

the first and second panes of glass comprise strengthened soda lime glass having a thickness in the approximate range from about 3.0 mm to about 6.0 mm; and the first, second, third and fourth substrates comprise low CTE borosilicate glass having a thickness of about 0.5 mm.

\* \* \* \* \*